Aug. 31, 1943.  C. A. NERACHER ET AL  2,328,392
POWER TRANSMISSION
Filed May 13, 1938  11 Sheets-Sheet 1
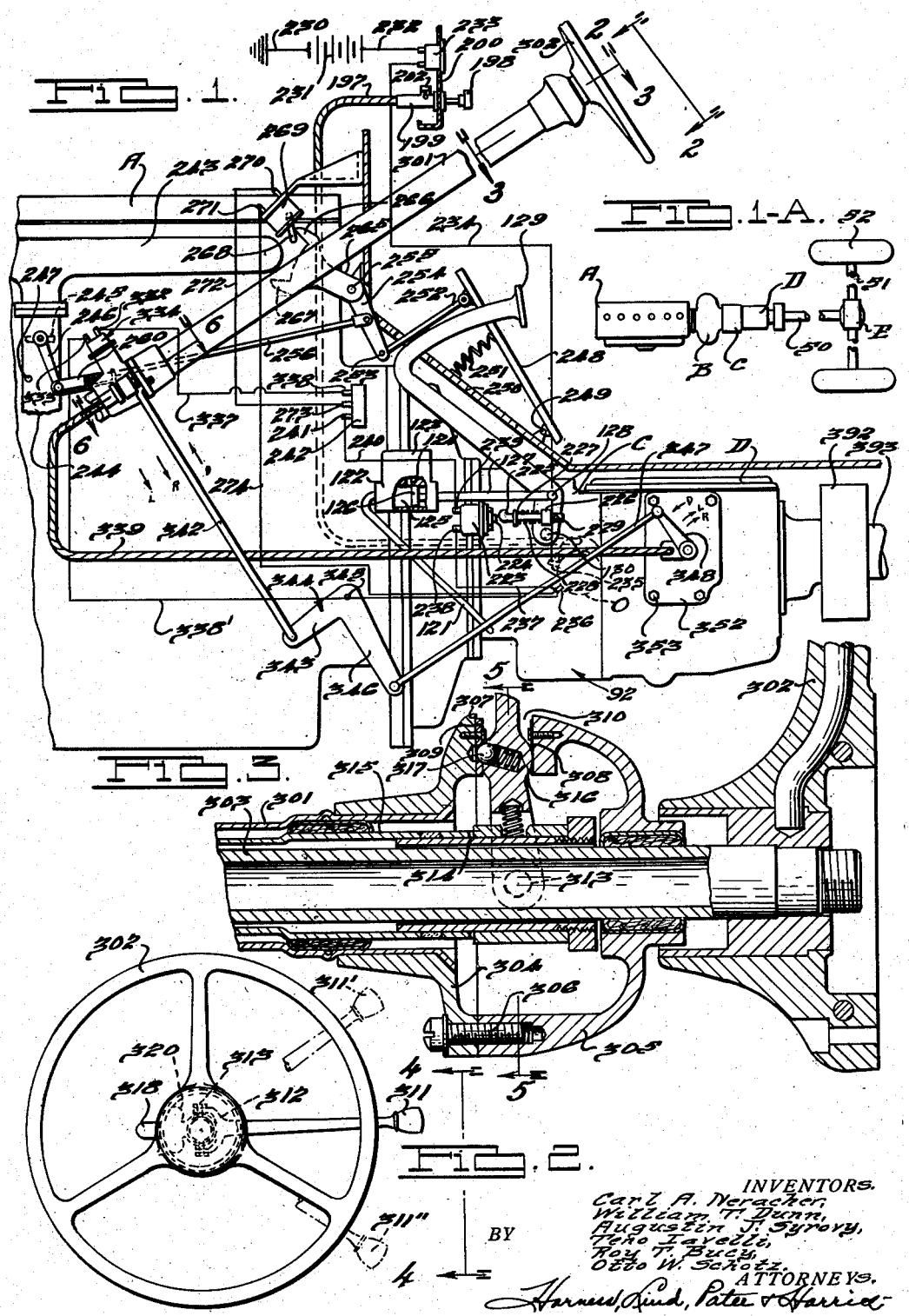
INVENTORS.
Carl A. Neracher,
William T. Dunn,
Augustin J. Syrovy,
Teno Iavelli,
Roy T. Bucy,
Otto W. Schotz
BY
ATTORNEYS.

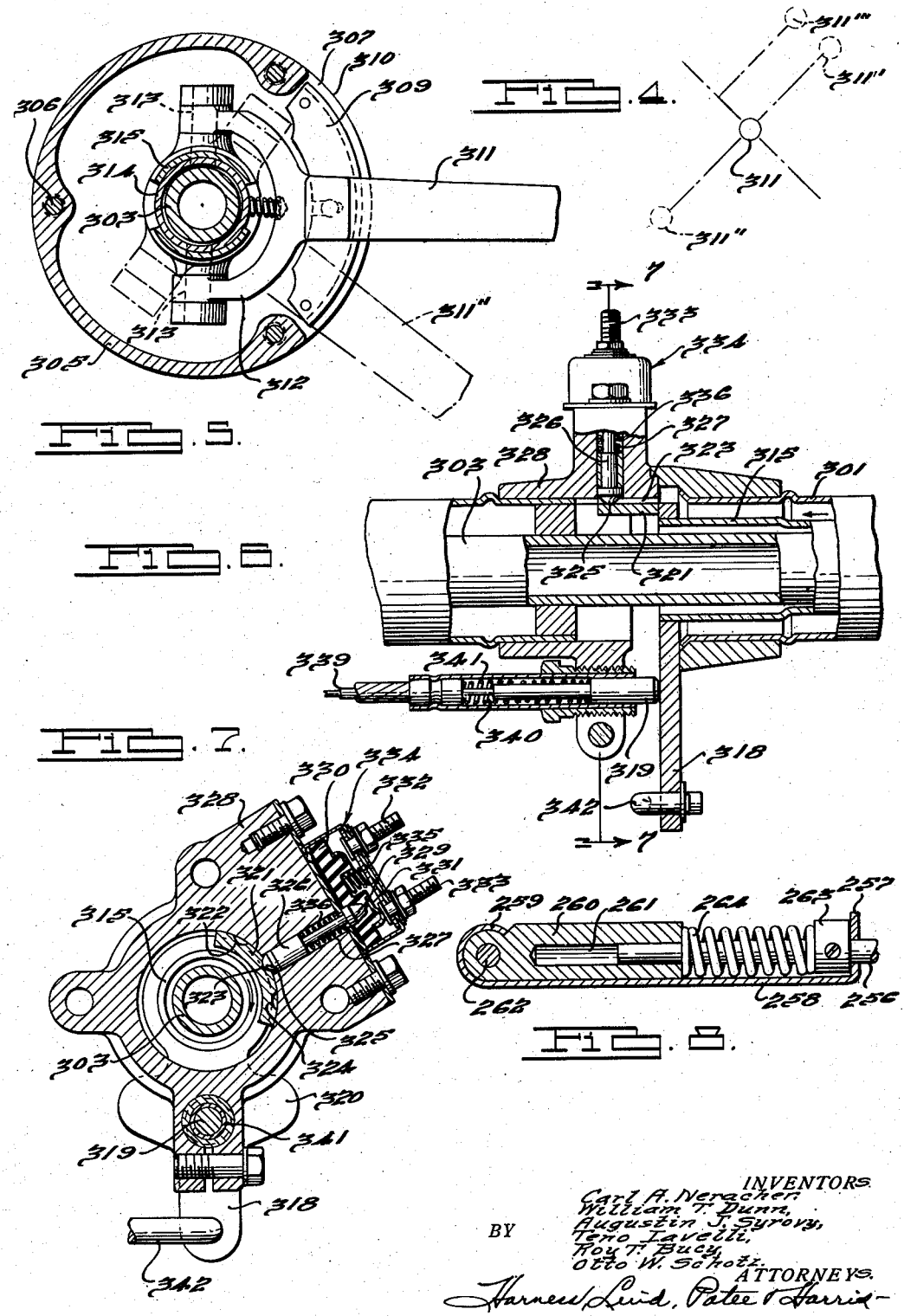

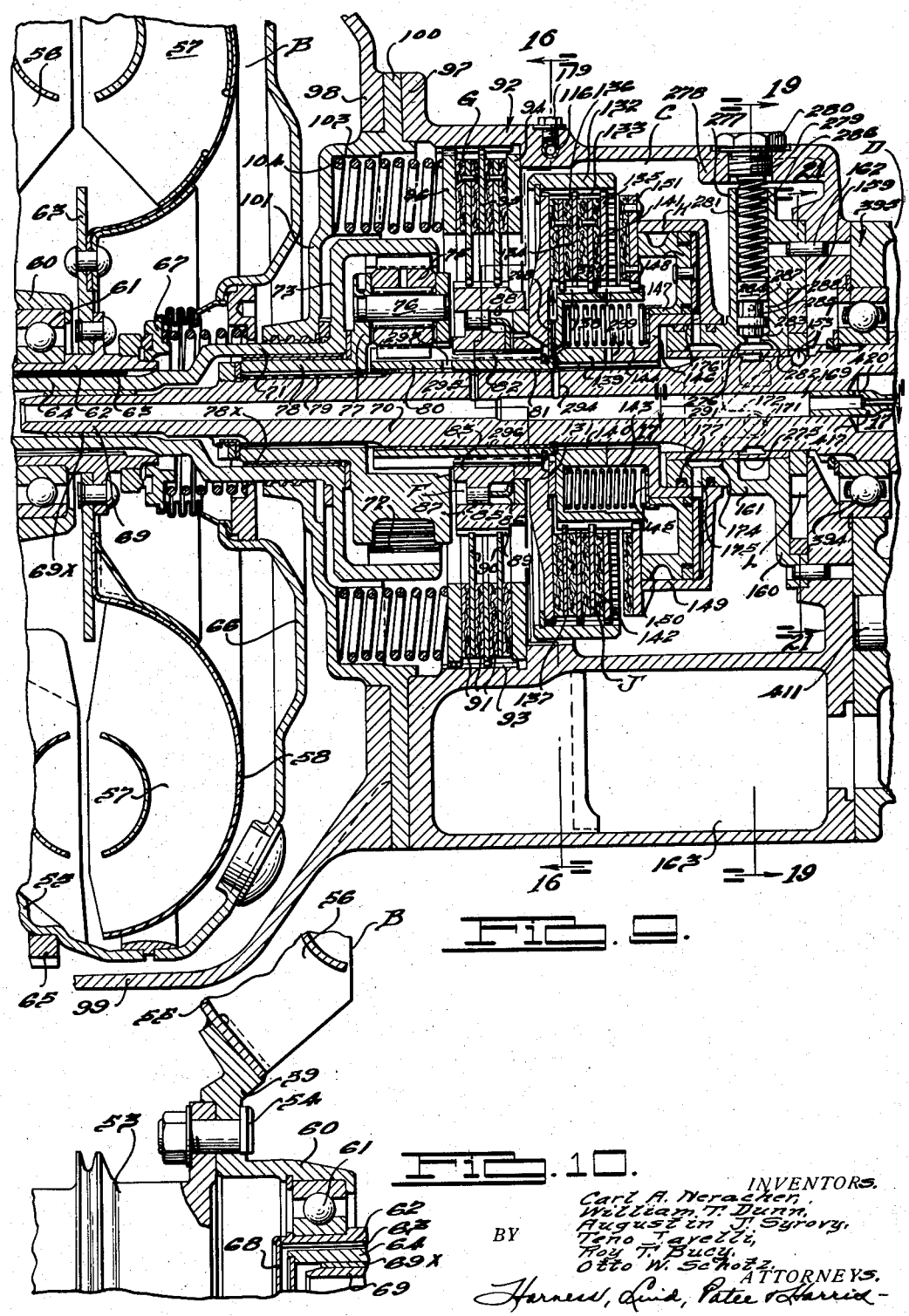

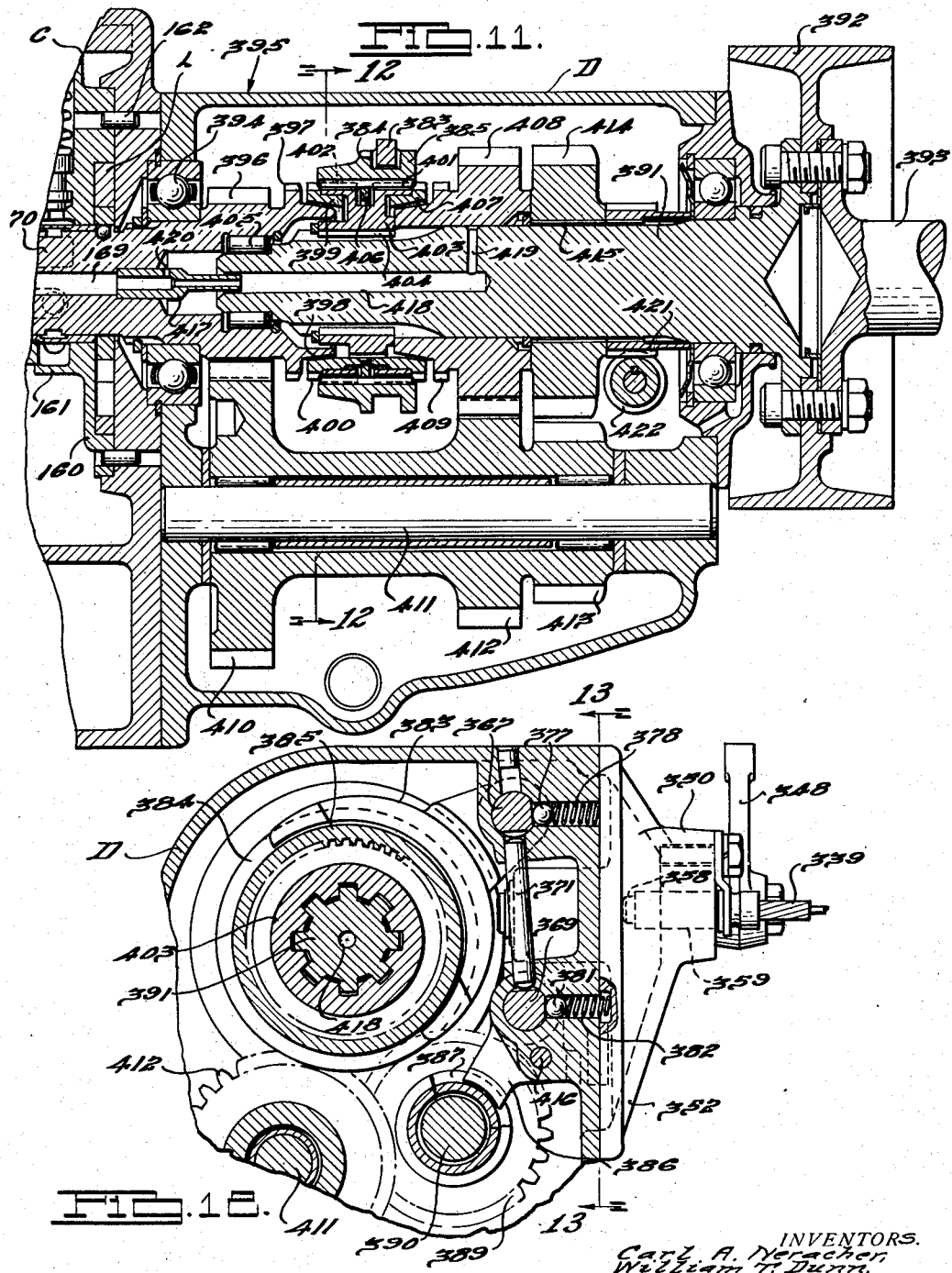

Aug. 31, 1943.    C. A. NERACHER ET AL    2,328,392
POWER TRANSMISSION
Filed May 13, 1938    11 Sheets-Sheet 5

INVENTORS.
Carl A. Neracher,
William T. Dunn,
Augustin J. Syrovy,
Teno Iavelli,
Roy T. Bucy,
Otto W. Schotz
BY
Harness, Dickey, Pierce & Harris
ATTORNEYS.

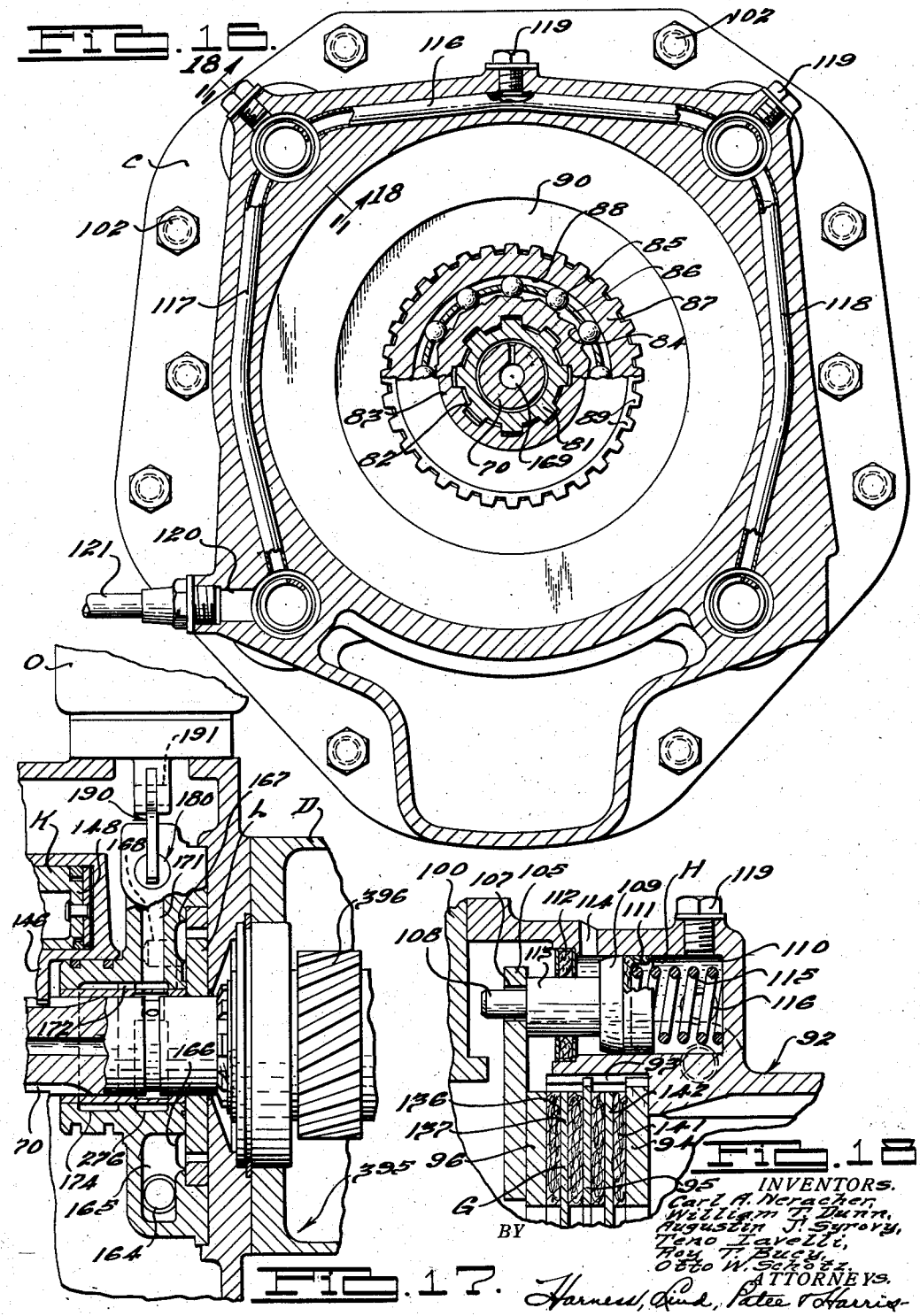

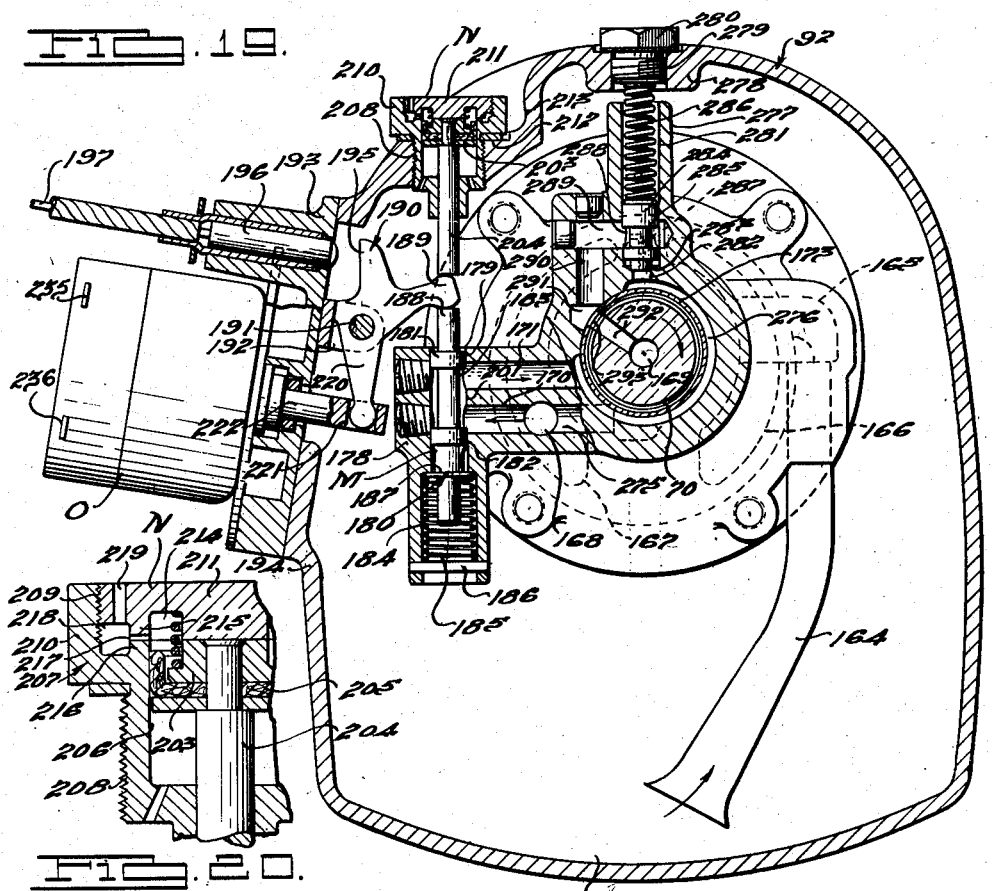

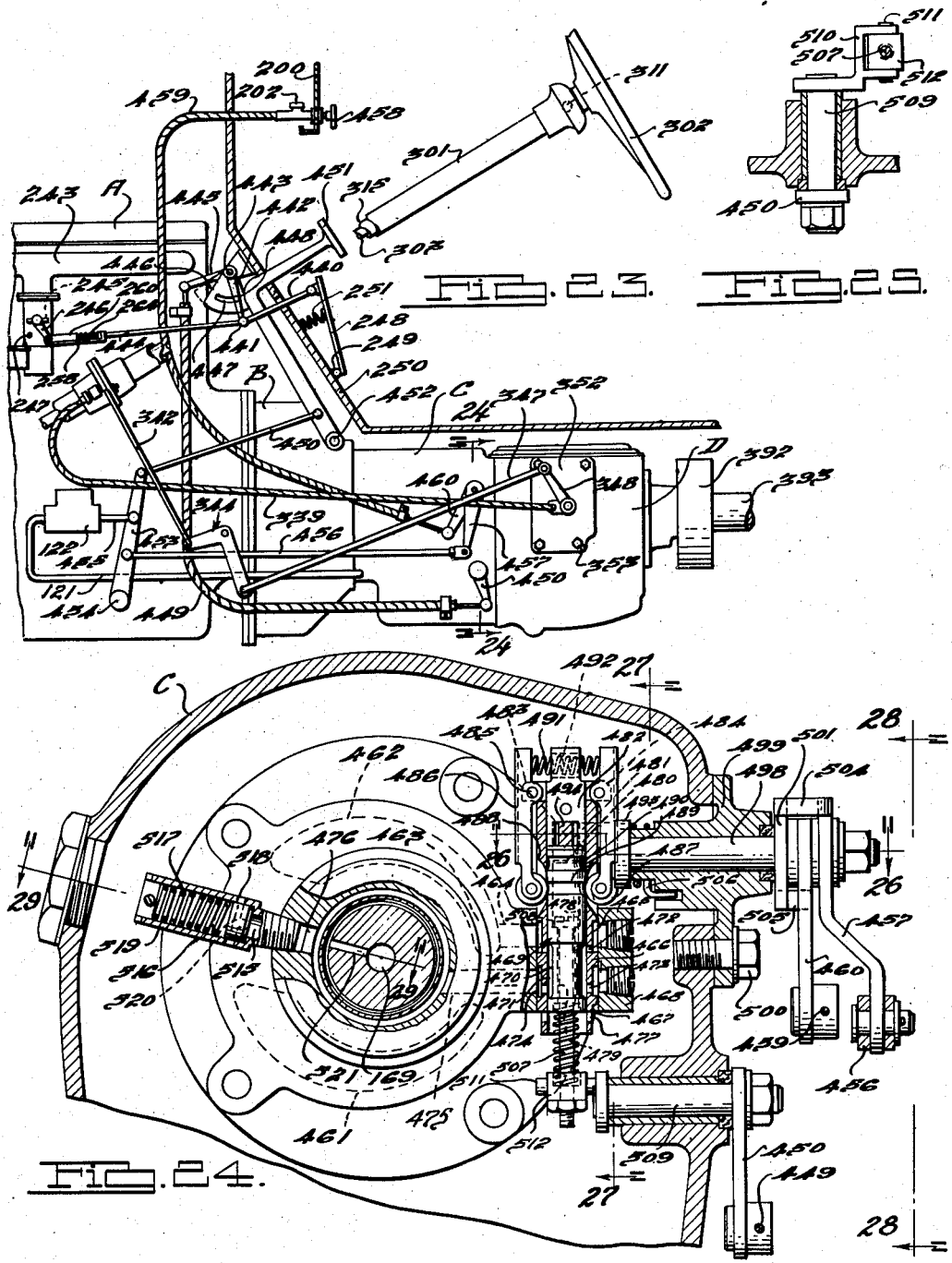

Aug. 31, 1943.   C. A. NERACHER ET AL   2,328,392
POWER TRANSMISSION
Filed May 13, 1938   11 Sheets-Sheet 9

INVENTORS.
Carl A. Neracher,
William T. Dunn,
Augustin J. Syrovy,
Teno Iavelli,
Roy T. Bucy,
Otto W. Schott.
BY Harness, Dind, Patee & Harris
ATTORNEYS.

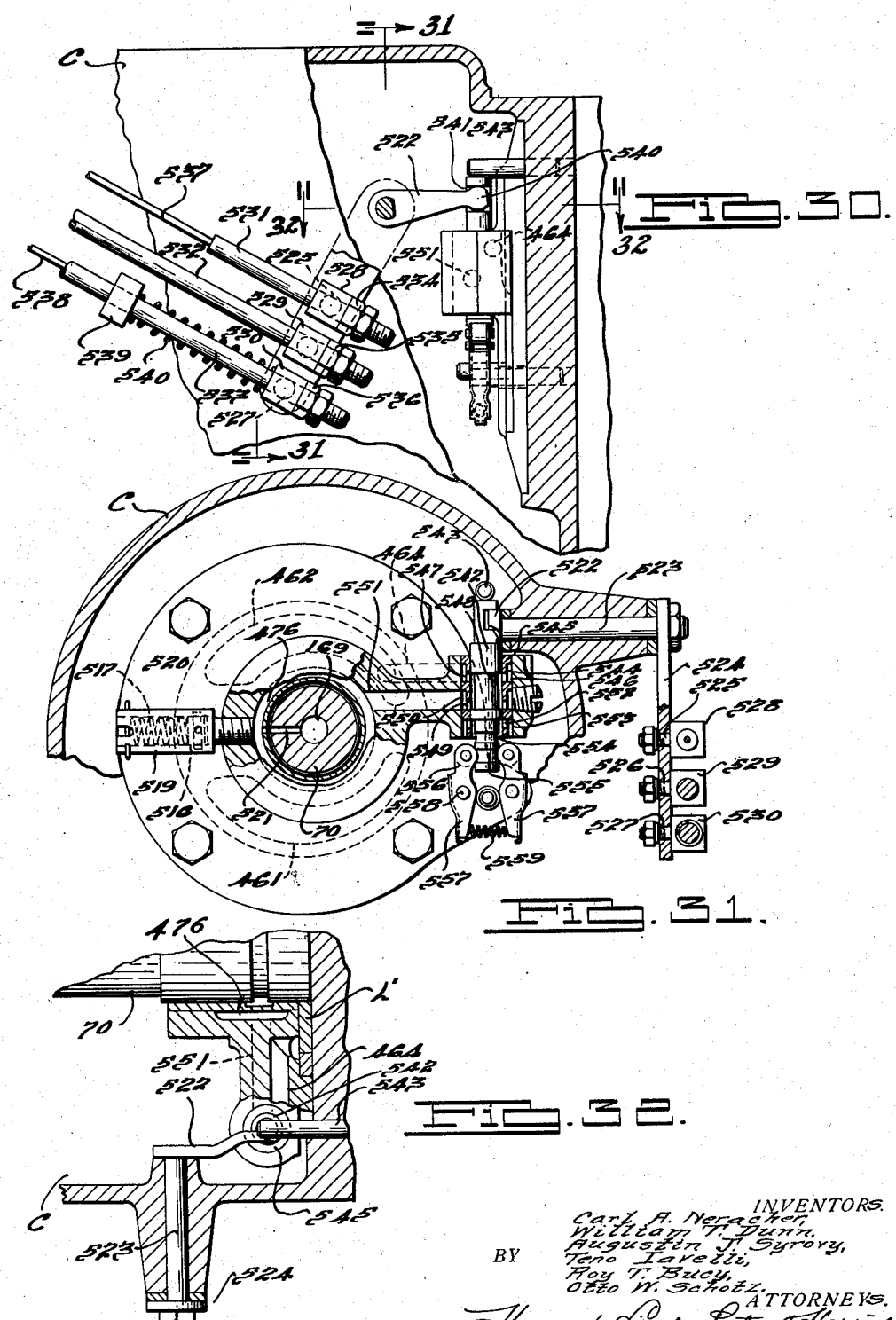

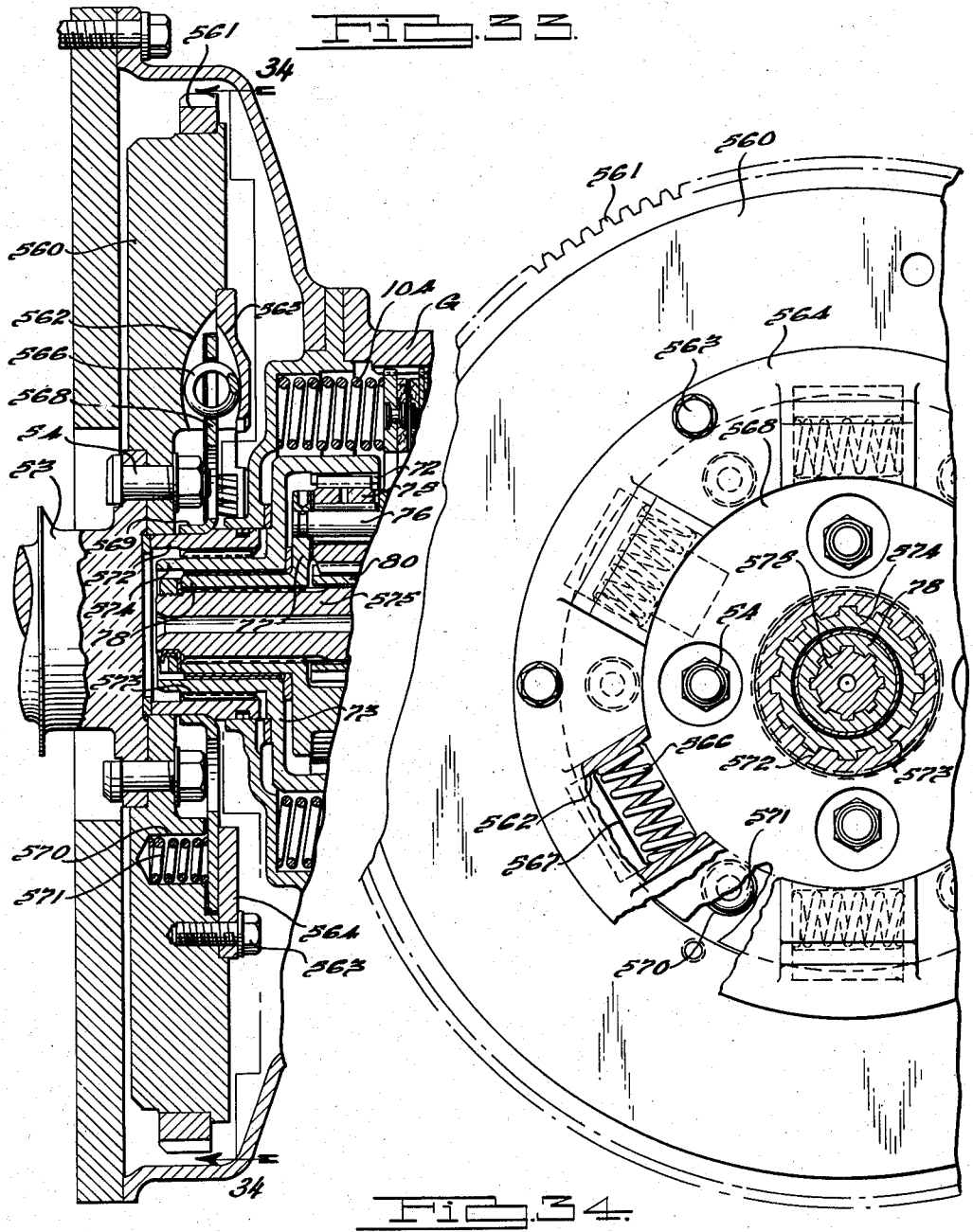

Patented Aug. 31, 1943

2,328,392

UNITED STATES PATENT OFFICE 2,328,392

POWER TRANSMISSION

Carl A. Neracher, William T. Dunn, Augustin J. Syrovy, Teno Iavelli, Roy T. Bucy, and Otto W. Schotz, Detroit, Mich., assignors to Chrysler Corporation, Highland Park, Mich., a corporation of Delaware Application May 13, 1938, Serial No. 207,714

86 Claims. (Cl. 74—290)

This invention relates to power transmission of the type especially adapted for transmitting power for driving a motor vehicle.

One object of our invention is to provide an improved system of motor vehicle drive control embodying more desirable flexibility of speed ratio changing, improved ease of operation, better economy of driving; also many features of vehicle drive control which adapted themselves to driving conditions at any time.

Heretofore it has been customary in many motor vehicle transmission systems to employ a change speed transmission of general standard type, giving three forward speed ratios including direct and a reverse drive, together with an overdriving mechanism behind the standard transmission so that the drive passes first through the standard transmission and then to the overdrive mechanism. In such systems the usual relatively slow speed axle ratio of about 4.3 is customarily used. This well known overdrive mechanism provides an overrunning direct drive which is releasable, on release of the accelerator pedal to slow down the engine and the attainment of a predetermined vehicle speed such as forty miles per hour, to automatically engage a centrifugal clutch to effect an overdrive through a planetary gear set. When the vehicle speed in overdrive drops down to a predetermined speed at which the overdrive control clutch will automatically release, generally around 25 miles per hour, the drive is then automatically resumed in direct. This known arrangement is advantageous in slowing down the engine less than a direct drive to the usual propeller shaft with resulting fuel economy, reduction in engine wear, quieter operation of mechanical parts and other known advantages.

With the foregoing known overdrive arrangement, there is lacking a desired flexibility of drive control in that the overdrive is effective only on attaining a predetermined vehicle speed and once engaged cannot be released until the car speed has dropped as aforesaid. Such arrangement prevents the realization of overdrive economy for city driving which is ordinarily 75% of average driving conditions. There is also the disadvantage in that, when in overdrive, the unfavorable speed ratio drive prevents rapid car acceleration as is frequently desirable in passing another car or where for other reasons the engine is called on to suddenly deliver greater torque or to rapidly accelerate the car. If the overdrive cut-in speed were reduced to, say 20 miles per hour, to enable more economical running in the city then the resulting unfavorable speed ratio would give sluggish performance for rapid acceleration in traffic conditions.

Further disadvantages of the aforesaid conventional overdrive mechanism are that a very sturdy gearing is required because it is behind the standard type transmission wherein torque can be multiplied; also the requirement for mechanism to render the direct drive overrunning clutch inoperative to enable driving the vehicle in reverse.

Our present transmission system overcomes the disadvantages of the aforesaid known type of overdrive mechanism and offers many advantages of structure, drive functions, and economy not heretofore possible.

We preferably employ certain fundamental arrangements of parts such as the use of an underdrive or reduction drive mechanism ahead of a change speed transmission of conventional or other type, together with a relatively fast axle ratio in the neighborhood of 3.5 by way of example.

While the underdrive mechanism may have any desired number of speed ratio drives or changes, we preferably provide an arrangement whereby the drive through this mechanism is either direct, viz., a speed ratio of 1 to 1, or an underdrive, viz., a speed reduction less than 1 to 1. More particularly our underdrive mechanism is preferably so arranged that during normal car running the drive therethrough is a direct drive although the underdrive is obtained at will and during initial acceleration of the car from standstill thereby obtaining the advantage of more powerful and faster car acceleration. Thus the effect of a normal direct drive, in conjunction with the relatively fast axle ratio and a setting of direct drive in the change speed transmission behind the underdrive mechanism, is substantially the equivalent of obtaining an overdrive from the engine to the car driving ground wheels.

The direct drive offers advantages of quiet running and high economy for city as well as country driving conditions, our control system being such that the underdrive may be immediately brought into action at any time without shock or jolt to the passengers or the parts of the driving mechanisms. Furthermore, the underdrive mechanism is operable at will from the underdrive to the faster drive, such as direct, without shock or jolt.

We have provided an underdrive mechanism which employs gearing of the planetary type for obtaining the underdrive ratio since this general type of gearing offers many advantages of quietness of operation, compactness, and unique ability of control. During the direct drive the gearing is locked-up so that it turns as a unit with the driving and driven shafts of the underdriving mechanism.

We preferably employ a fluid coupling for providing a drive connection between the engine and the underdrive mechanism although our power transmission as a whole may be used in conjunction with other forms of clutches such as the ordinary plate-type friction clutch for releasing the drive between the engine and underdrive mechanism.

A fluid coupling is however employed by preference since, among its advantages are long life without wear since the circulating fluid provides the drive connection; inherent slip which accommodates the use of a relatively fast axle to great advantage since the engine can rapidly accelerate up to its maximum torque ahead of the parts driven therefrom, thereby increasing what is known as car performance or accelerating ability; smooth car get-away largely because at lower speeds the cushioning effect of the coupling is highest; elimination of rattle and backlash noises through the whole car driving mechanism and making highly accurate fits of parts less necessary since the engine torque impulses are not transferred back to the driven parts owing to the drive taking place through a liquid medium; reduction in the necessity for shifting gears or manipulating speed changes to the usual degree in the change speed transmission because of the slip characteristics of the coupling; elimination of wear as in the facings of conventional friction clutches; prevention of damage to driven parts of the car mechanism making it possible to use lighter and cheaper structures because of the softness of the fluid clutch action making abuse of the parts impossible; provision for safer and easier driving on slippery pavement because of the gentle acceleration and retardation characteristics; provision for safety feature if the engine should stall on a hill since the engine may be started without the driver declutching or removing his foot from the brake pedal; making unnecessary the driver holding his foot on the usual clutch pedal while the car is stopped in traffic; and providing for increased car performance without enlarging engines thereby offering lower weight and cost together with increased oil and fuel economy, and increased engine life.

Our underdrive mechanism provides reduction gearing, preferably of the planetary type, having drive control means normally operating to effect the underdrive but releasing either at the will of the driver or automatically in response to operation of the direct drive. Of especial advantage where a fluid coupling is employed, the underdrive control means is rendered ineffective for a release of the underdrive at the will of the driver. This provides for release of the underdrive so as to disconnect the fluid coupling from the transmission mechanism rearwardly thereof, thereby to facilitate selective manipulation of the transmission mechanism especially in starting the car from standstill.

The direct drive of the underdrive mechanism likewise has control means therefor normally operating when the car is running but automatically releasing when the car is standing still. We also make provision for automatic operation of this control means in response to car acceleration in the underdrive to effect an automatic step-up in the drive. Thus to initially accelerate the car it is only necessary to effect release of the underdrive control means in order to manipulate the selectively operable transmission while selective operation during normal car running requires only release of the direct drive control means because of the releasable characteristic of the underdrive. In order to minimize the number of driver controls and simplify the operating system we preferably provide a driver operated control element such as a foot pedal for example and means operated thereby to effect simultaneous or joint release of the control means for both the underdrive and the direct drive. Thus, under any conditions of car drive or at standstill, the drive through the underdrive mechanism may be released even though the engine is running fast enough to operate the driving shaft of the underdrive mechanism by virtue of the fluid medium circulated in the fluid coupling.

In the event that the fluid coupling is dispensed with, a conventional friction plate-type clutch may be employed in which case it is not necessary to use a driver release means for the underdrive control means. When the driver release means is employed, the underdrive mechanism may, if desired, be connected directly to the engine as will be more apparent from the detailed description of our invention in illustrative form.

We also employ a novel control system whereby the direct drive of the underdrive mechanism may be released at the will of the driver preferably by several independently operable driver controls. One of these controls is provided to enable sustained underdrive without the direct drive coming into action, this overall drive thus preventing automatic operation of the step-up drive.

Another of the aforesaid controls is operable in response to driver operation of the engine throttle adjusting mechanism to automatically effect a kick-down or step-down from direct to underdrive and, on release or partial release of the accelerator pedal, the direct drive is restored. Preferably the arrangement is such that the accelerator pedal has a kick-down range beyond its wide open throttle position, the pedal overtravelling the throttle valve. This operation of the accelerator pedal is a natural movement by the operator when desiring faster car acceleration which is readily obtained in the underdrive ratio without shifting the change speed transmission. Once the mechanism is operated for kick-down the direct drive is, by preference, not restored until the accelerator pedal is substantially fully released thereby preventing undesired speed ratio changes within a narrow range of movement of the accelerator pedal. A further feature of our invention resides in the provision of control means, such as a dashpot, for regulating the operation of the direct drive when changing from underdrive thereby obtaining smooth change after kickdown for example.

We have provided a novel underdrive mechanism wherein one of the elements of the planetary gearing constitutes a drive control element in conjunction with the underdrive control means. This control element is adapted, when held, to take reaction of the underdrive. By providing the control means with an overrunning device between the reaction-taking element and a holding means therefor, the underdrive will be made to automatically function, while releasing in response to the faster or direct drive. The overrunning device thus is part of the underdrive while overrunning during the faster or direct drive. Furthermore by providing means to release the holding means the overrunning device may be rendered ineffective to hold the control element for taking reaction and thus the underdrive may be released. This releasable holding means is, as aforesaid, of especial significance in systems employing a fluid coupling or where no main clutch is used. The releasable holding means, in conjunction at times with the direct drive control means, functions as the release means between the engine and change speed transmission.

For the relatively fast drive through the underdrive mechanism, we have provided control means in the form of a clutch adapted to lock the underdrive gearing to directly drive the driven shaft from the driving shaft. This clutch is arranged to engage automatically in response to predetermined car speed and, by preference, pressure fluid is utilized to engage the direct clutch, the supply of pressure fluid to operate the clutch being controlled by valving means adapted for operation in response to driver operation of the aforesaid driver controls. A further feature of our invention resides in the provision of novel means for controlling the length of time of car acceleration in underdrive before automatic engagement of the direct drive clutch takes place.

In one embodiment of our invention we have provided means for effecting release of the direct drive clutch in response to driver manipulation of the change speed transmission so that, for speed ratio changes in this transmission, it is unnecessary during normal car running for the driver to manually release any of the drives in the underdrive mechanism. This direct drive release preferably comprises a solenoid which, when energized during driver manipulation of the change speed transmission, operates the valving means to cut-off pressure fluid delivery to the direct clutch. The solenoid is also adapted for independent energization by operating the aforesaid pedal and kick-down mechanisms.

A further feature of our invention resides in an improved planetary gear transmission wherein the parts thereof and associated shafts are arranged in a compact manner for minimizing space required for installation, simplicity of assembly, low cost of manufacture and improved efficiency of operation.

Another feature resides in the provision of an improved change speed transmission and manipulative control therefor. This transmission is preferably arranged to take the drive from the planetary gear transmission for selectively obtaining a plurality of forwardly driving speed ratios and reverse drive from the driven shaft of the planetary transmission to the output or tailshaft leading from the change speed transmission. By virtue of the novel characteristics of our underdrive mechanism, the change speed transmission, when employed in the power transmission as a whole, preferably provides for a low or speed reduction and a faster drive preferably direct. Such an arrangement employed in conjunction with our underdrive mechanism provides for improved flexibility of vehicle drive control and an advantageous combination of speed ratio drives since, in effect, four forward speed ratios are obtainable together with a reverse which does not require shift control of the overrunning device of the underdrive control means since, by preference, only forward speeds are transmitted through the underdrive mechanism to the change speed transmission.

In starting the car the change speed transmission may be manipulated for either low or direct and the car will drive in the underdrive of the underdrive mechanism automatically stepping-up to a faster or direct drive in the underdrive mechanism. The change speed transmission is preferably manipulated by a remote control mechanism conveniently located at the car steering wheel and this transmission incorporates improved features of simplified structure and efficient operation of the parts.

An additional object of our invention is to provide a driving mechanism embodying a pumped valve-controlled oil supply to a change speed controlling device wherein, while the mechanism is driving or while the pump is operating, oil is supplied for lubricating parts of the mechanism regardless of the position of the valve.

Further objects and advantages of our invention reside in the novel combination and arrangement of parts more particularly hereinafter described and claimed, reference being had to the accompanying drawings illustrative of several embodiments of our invention in which:

Fig. 1 is a side elevational view of our power transmission somewhat diagrammatic in form especially in connection with the wiring diagram.

Fig. 1A is a diagrammatic plan view of the vehicle power transmission.

Fig. 2 is a top plan view of the steering wheel taken as indicated by line 2—2 of Fig. 1 and illustrating the driver operated remote control shifting element.

Fig. 3 is a sectional view taken as indicated by line 3—3 of Fig. 1 illustrating the remote control mechanism.

Fig. 4 is a diagram of the path of shifting movements of the shifting element at the steering wheel as viewed by the indicating line 4—4 of Fig. 2.

Fig. 5 is a sectional view of the remote control mechanism taken as indicated by line 5—5 of Fig. 3.

Fig. 6 is a sectional view showing the mechanism of the remote control located at the lower end portion of the steering post, the section being taken looking downward and rearward generally as indicated by line 6—6 in Fig. 1 but deviating therefrom to show the electrical switch structure which is best shown in Fig. 7.

Fig. 7 is a sectional bottom view taken as indicated by line 7—7 of Fig. 6.

Fig. 8 is a detail sectional elevational view of a portion of the engine throttle valve adjusting means.

Fig. 9 is a sectional elevational view illustrating the forwardly located speed ratio changing or underdrive mechanism and illustrating a fluid coupling drive thereto.

Fig. 10 is a fragmentary sectional elevational view showing the fluid coupling drive from the engine.

Fig. 11 is a sectional elevational view illustrating the rearwardly located speed ratio changing transmission.

Fig. 12 is a sectional elevational view taken as indicated by line 12—12 of Fig. 11.

Fig. 16 is a sectional elevational view looking toward the front and taken as indicated by line 16—16 of Fig. 9.

Fig. 17 is a sectional plan view illustrating a portion of the pressure fluid supply system for the direct drive control means of the underdrive mechanism, the view being taken generally as indicated by line 17—17 of Fig. 9.

Fig. 18 is a detail sectional view through one of the pressure fluid operated motors for releasing the underdrive controlling means, the view being taken as indicated by line 18—18 in Fig. 16.

Fig. 19 is a sectional elevational view looking toward the rear illustrating the pressure fluid control system for the controlling means of the direct drive in the underdrive mechanism, the view being taken as indicated by line 19—19 of Fig. 9.

Fig. 20 is an enlarged fragmentary view of a portion of the dashpot as seen in Fig. 19.

Fig. 21 is a sectional elevational view of the pressure fluid pump taken as indicated by line 21—21 of Fig. 9.

Fig. 22 is a detail sectional side elevational view illustrating a modified arrangement for energizing the solenoid by driver operation of the means for effecting release of the underdrive controlling means.

Fig. 23 is a view generally corresponding with Fig. 1 but illustrating a somewhat modified system of transmission control.

Fig. 24 is a sectional elevational view generally corresponding to Fig. 19 but illustrating the valving means of the Fig. 23 modification, the view being taken as indicated by line 24—24 of Fig. 23.

Fig. 25 is a detail sectional plan view taken along line 25—25 of Fig. 27.

Fig. 30 is a sectional elevational view of another modification showing a control system in form for use with the Fig. 23 system.

Fig. 31 is a side sectional elevational view taken as indicated by line 31—31 of Fig. 30 with parts broken away to illustrate the valving mechanism.

Fig. 32 is a detail sectional plan view taken along line 32—32 of Fig. 30.

Fig. 33 is a fragmentary sectional elevation showing a portion of the Fig. 9 structure modified by the omission of the fluid coupling.

Fig. 34 is a sectional elevational view taken as indicated by line 34—34 of Fig. 33.

Figure 13:
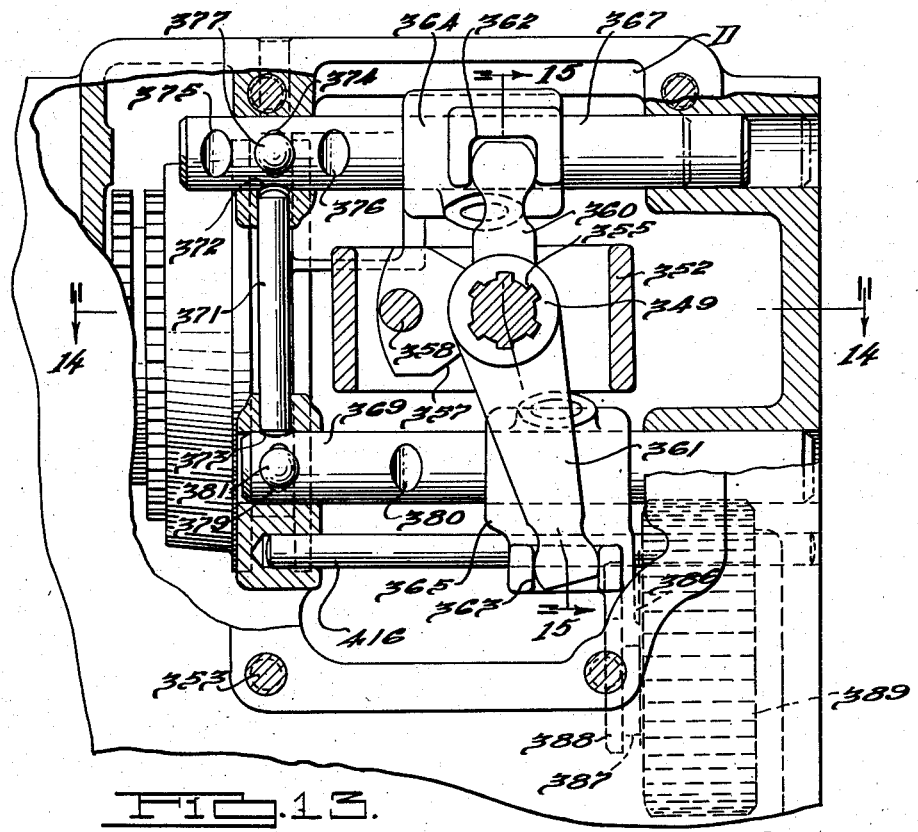
Fig. 13 is a side elevational view taken along line 13—13 of Fig. 12 with parts broken away to illustrate the shift mechanism for the change speed transmission.

Referring to the drawings we have elected to illustrate the principles of our invention in connection with power transmission for a motor vehicle although we desire to point out that many of the features of our invention are capable of use to advantage in other forms of devices. In connection with the adaptation of our invention as a motor vehicle power transmission, we have illustrated in Fig. 1A, in diagrammatic form, a typical arrangement of the principal illustrated portions of our power transmission wherein reference character A represents the motor vehicle prime mover which is preferably in the form of the well known internal combustion engine, the drive passing from the engine through a clutch which, by preference, is a fluid coupling B, to the speed ratio changing means herein illustrated as comprising a forward mechanism C and a rearward mechanism D from which the drive may pass, for the usual type of rear drive, by way of a conventional propeller shaft 50, thence through the differential E to drive the rear axle portions 51 which have the usual drive connection to the rear vehicle ground wheels 52. As will be presently more apparent, a more conventional type of main clutch may, if desired, be substituted in place of the fluid coupling B or the drive may pass directly from engine A to the speed ratio changing mechanism; also the mechanisms C and D may be disposed in a single casing and in many instances it may be preferred to omit at least the forwardly driving speed ratios of the mechanism D inasmuch as the mechanism C will, by itself, provide for improved flexibility of forwardly driving speed ratio changes. We also desire to point out that our references to parts "rearwardly" or "forwardly" are terms employed in their relative sense and are used for convenience of reference in referring to the illustrated embodiments of our invention.

The engine A has its crankshaft 53 (Fig. 10) connected by fasteners 54 with the impeller 55 of the fluid coupling B, this impeller having the usual fluid circulating vanes 56 which extend substantially radially of the axis of rotation of the impeller and which are spaced circumferentially around the impeller so that the fluid medium, such as oil, is caused by centrifugal force to go outwardly in the spaces between the vanes 56 for discharge into the spaces between the vanes 57 of the runner 58 whereby the latter is driven from the impeller in a manner which is generally well known.

In order to facilitate the manufacture of the fluid coupling the impeller may be mounted on the crankshaft 53 by reason of the hub 59 suitably welded to the impeller and having a rearwardly extending hollow journalling portion 60 adapted to receive the frictionless bearing 61 which is supported inwardly by a second hub 62, the latter being fixed with the runner 58 through the intermediary of the baffle plate 63 which has the known function of interrupting the circulation of the fluid in the coupling when the engine is idling to thereby minimize the drag or driving effect through the coupling at times when such drive is not desired.

The runner 58 is thus centered and journalled by its hub 62 and the bearing 61 within the hollow hub 60 rigidly carried by crankshaft 53. Disposed within the hollow hub 62 and splined for driving connection therewith at 63 is the forward reduced end portion of a hollow shaft 64, this shaft extending forwardly within the bearing 61 for centering support thereby and constituting the driving shaft for transmitting drive from engine A and fluid coupling B to the forwardly disposed portion C of the general speed ratio changing mechanism.

The impeller 55 carries the engine starting ring gear 65 and is also formed with a rear housing portion 66 which extends inwardly around the runner 58 and is provided with any suitable type of fluid seal, generally designated at 67 whereby escape of fluid is prevented at the rear portion of the runner 58. The forward end of the hub 62 is closed by a plug 68 for preventing escape of fluid rearwardly within this hollow hub. Disposed within bearing 61 of the hollow forward end portion of the driving shaft 64 is the reduced forward end portion 69 of the driven shaft 70, the latter being the shaft which transmits the drive from the driving shaft 64 to the rearwardly disposed portion D of the speed ratio changing mechanism. This shaft 70 is therefore in the nature of an intermediary shaft and becomes the driving shaft for the mechanism D. Shaft portion 69 is journalled by a bushing 69x within shaft 64 and is thereby also centered by bearing 61.

For convenience of reference we will refer, unless otherwise noted, to "forward" rotation as being the rotation corresponding to that of the crankshaft 53 which has the usual clockwise rotation viewed from front to rear, this being the direction of rotation of shafts 64 and 70 when transmitting the drive to the mechanism D wherein we have located means for reversing the normal direction of drive in order to operate the vehicle in reverse.

The mechanism C preferably comprises a speed ratio changing mechanism employing planetary gearing and more particularly this mechanism is arranged to provide selectively operating forward drives, one of which is a reduction or underdrive and the other of which provides a relatively faster drive of the driven shaft 70 with respect to the driving shaft 64. This relatively faster drive is arranged to provide a direct drive wherein the speed ratio is 1 to 1.

The driving shaft 64 extends rearwardly to provide an enlarged hollow intermediate portion 71 carrying at the rear end thereof an internal or annulus gear 72 adapted for direct drive connection with the driving shaft portion 71 through the intermediate spider portion 73 of the driving shaft. Meshing with this annulus gear are a plurality of planet gears or pinions 75, one of which is illustrated in Fig. 9, each planet gear being rotatably mounted on an axle shaft 76 supported by a carrier structure 77 having a forwardly extending hollow hub portion 78 thereof extending within the hollow intermediate portions 71 of driving shaft 64 and being splined at 79 for direct drive connection with the driven shaft 70. The driving shaft 64 is therefore constructed with a rearwardly direct enlargement to provide the annulus gear 72, this arrangement permitting the carrier 77 to extend directly inwardly from the axles 76 for direct drive connection with the driven shaft 70. The hub portion 78 is preferably journalled within shaft portion 71 by a bearing such as the babbitt lined bushing 78x.

The planet gears 75 also mesh with a hollow sun gear 80 which is loosely journalled on the driven shaft 70, the sun gear having a rearwardly extending controlling portion 81. As thus far described, it will be apparent that if the sun gear 80 is held against a tendency to rotate backwardly when the driving shaft 64 rotates forwardly, then the annulus gear 72 will operate through the planet gears 75 to transmit an underdrive to the driven shaft 70 relative to the speed of rotation of the driving shaft 64 by virtue of the carrier 77 driving through the splines 79 on the driven shaft 70. The sun gear 80 under such conditions provides reaction for the underdrive and in the event that the sun gear is directly drivingly connected with one of the other members or elements of the planetary train, then the entire train will be locked to cause the gearing to rotate as a unit in transmitting a direct drive from driving shaft 64 to the driven shaft 70. In applying these principles to our invention, we have provided controlling means for the rotatable reaction-taking sun gear 80 of such a nature that rotational tendency of the sun gear in a direction opposite to that of the forward drive of the driving shaft 64 is prevented preferably by an overrunning device so constructed and arranged that when the planetary gearing is locked for the direct drive the holding means will automatically release to accommodate the forward drive of the sun gear. By preference, the arrangement is such that normally backward rotation of the sun gear is prevented while means is provided under control of the vehicle driver to render this holding means inoperative in order to permit free backward rotation of the sun gear and thereby disconnect the drive to the driven shaft 70 through the reduction planetary gearing. We have also provided a second controlling means adapted to function in conjunction with the sun gear 80; this latter controlling means will preferably be in the form of a pressure fluid operating clutch adapted when engaged to effect a direct drive connection between shafts 64 and 70 as by directly drivingly connecting sun gear 80 with the carrier 77 through the intermediary of driven shaft 70.

Referring now to the controlling means releasably effecting the underdrive through the underdrive mechanism C, the controlling extension 81 of the sun gear has a splined connection at 82 with the inner cammed member 83 of the overrunning control device, generally indicated at F. This cam member is provided with a series of cam portions 84 engaging the overrunning rollers 85 maintained in properly spaced relationship with each other by a cage 86 in the manner generally well known in connection with the so called free wheeling devices. The outer member 87 of the overrunning device is provided with an internal cylindrical surface 88 (Fig. 16) and it will be noted that the cam surfaces 84 are so arranged that rollers 85 will be automatically wedged with the overrunning control member 87 when the sun gear 80 tends to rotate backwardly although whenever the sun gear tends to rotate forwardly the rollers 85 will be automatically released to permit free forward rotation of the sun gear.

In order to hold the outer member 87 against backward rotation and to provide for release of this outer member when desired, we have provided a releasable braking means generally designated at G preferably in the form of a plurality of annular friction discs generally similar to those employed in multiple disc clutches. The outer member 87 is provided with a series of longitudinally or axially extending splines 89 which receive a plurality of discs 90 carrying the mats of friction material 91 at their outer peripheries. The casing 92 of mechanism C is provided with a series of internal splines 93 for receiving the rear stationary abutment plate 94, an intermediate plate 95 and a forward pressure plate 96, it being understood that plates 95 and 96 are held against rotation but are adapted to move axially along the splines 93 to release their frictional engagement with the mats 91 which are disposed to either side of the intermediate plate 95.

Secured between the forward flange 97 of casing 92 and the rear flange 98 of the fluid coupling stationary housing 99, there is disposed the flange 100 of a fixed intermediate member 101, a series of fasteners 102 being provided to secure the aforesaid flanged parts in fixed assembled condition. The member 101 has a circumferentially spaced series of spring-receiving pockets 103, each accommodating the forward end of a coil spring 104 thrusting against member 101 and also against the pressure plate 96, the combined thrust of the springs 104 being sufficient to normally pack the friction mats 91 against the plates 94 and 95 to hold the outer member 87 of the overrunning device F so that the underdrive may take place.

As best shown in Figs. 16 and 18, we have provided pressure fluid operating means for releasing the braking means G from the load of springs 104. At a plurality of points around the pressure plate 96, this plate has welded thereto the unloading plates 105 each of which extends outwardly from plate 96 for axial movement therewith, the splines 93 being of less length at the location of these plates 105, the plates 105 having longitudinal movement while being prevented from rotating. Each of the latter plates is formed with a longitudinally extending opening 107 which receives the forward end portion 108 of a piston 109 of the pressure fluid operated motor, generally designated as H in Fig. 18.

The casing 92 is provided with a plurality of forwardly opening cylinders 110 longitudinally aligned with the respective openings 107 of the unloading plates 105, each cylinder 110 slidably accommodating one of the pistons 109 each of which has a flexible expanding sealing element 111 adapted to prevent escape of pressure fluid forwardly of the piston. A further sealing means 112 is provided at the forward end of each cylinder 110 for sealing operation at the intermediate enlarged portion 113 of each piston 109, a vent 114 operating to allow each piston 109 to move freely forwardly without tendency of compressing air which would otherwise be trapped between the piston and the sealing means 112. A relatively light spring 115 is disposed within each cylinder 110 within the casing 92 and the piston seat 111 for maintaining the piston in proper assembled relationship with respect to the unloading plate 105. From Fig. 16 it will be apparent that we have illustrated four of the cylinders 110 and it will likewise be apparent that there will be provided four of the unloading plates similar to that illustrated at 105 in Fig. 18.

We have provided an improved means for delivering pressure fluid to the various cylinders 110 under control of the vehicle driver and preferably in response to manual pressure fluid pumping by reason of an actuating pedal. A pressure fluid conducting tube 116 is disposed transversely between the uppermost cylinders 110, further generally similar conduits or tubes 117 and 118 being respectively disposed generally vertically for connecting each of the lowermost cylinders 110 with an upper cylinder at the same side of the casing 92. The tubes 116, 117 and 118 are preferably located in the mold during the casting of the casing 92 so that they are imbedded in this casting and form an integral part thereof. In order to prevent accumulations of air within the fluid conducting system, we have provided one or more plugs 119 which may be removed when the system is filled with the operating fluid, such as oil, thereby insuring against trapping any air which might prevent efficient operation of the pistons 109.

Pressure fluid is adapted to be admitted at a convenient point such as at 120 to one of the lower cylinders 110, the pressure fluid being conducted by a pipe 121 which leads forwardly and upwardly (Fig. 1) to a master cylinder 122 having an oil storing and supply chamber 123 for supplying reserve oil through a passage 124 to a cylinder 125. The cylinder slidably receives a piston 126 operable by a piston rod 127 pivotally secured at 128 to the driver operable element or pedal 129 having a pivotal support at 130 to the casing 92 of the underdrive mechanism C. The arrangement is such that when the vehicle driver depresses the pedal 129, piston 126 will be moved forwardly to close off the reservoir supply passage 124 thereby building up a pressure at the forward portion of cylinder 125, this pressure fluid being delivered through the pipe 121 and thence through the pipes 117, 116 and 118 and into the cylinders 110 for simultaneously operating the pistons 109 forwardly. This will move the unloading plates 105 forwardly along with pressure plate 96 and compressed loading springs 104 so as to unload the braking thrust at the brake G and thereby effect release of this brake to render the overrunning control device inoperative as a holding means for preventing backward rotation of sun gear 80.

The controlling means for releasably effecting the relatively faster drive or direct drive through the underdriving mechanism C comprises the clutching means generally designated at J and is preferably in the nature of a multiple disc clutch. The driving portion of this clutch comprises an annular disc or spider 131 which is directly drivingly connected at its inner portion with the aforesaid splines 92 of the sun gear controlling extension 81 rearwardly of the cam member 83. Carried on the outer end of spider 121 is the drum-like member or cylinder 132 formed with longitudinally extending internal splines 133 which afford connection with spider 131 and also slidably receive the annular driving discs 134 and 135 whereby these discs cannot rotate relative to cylinder 132 but may have limited longitudinal sliding relative thereto. Interposed between spider 131 and driving disc 134 is the friction mat assembly 136 carried by a driven disc 137 having a similar splined connection at its inner portion with the splines 138 of a spring cage 139 splined at 140 for direct drive connection with the driven shaft 70. A similar friction mat assembly 141 is disposed between driving discs 134 and 135, this latter assembly also having a driven disc 142 likewise engaging splines 138.

The cage 139 is formed with a plurality of circumferentially spaced rearwardly opening spring-receiving pockets 143, each receiving a coil spring 144 thrusting rearwardly against the annular plate 145 which, when the clutch J is disengaged as in Fig. 9, acts against a rear wall 146 of the cage 139 and also against the inner annular flange 147 of an annular piston 148 which forms a portion of the pressure fluid operated motor, generally designated as K. This piston 148 is slidable within the annular chamber 149 which opens forwardly, the piston having an outer annular flange 150 adapted to thrust against the friction-mat-carrying pressure plate assembly 151 which is splined at 138 to the cage 139.

It will be apparent that when pressure fluid, such as oil, is introduced to the rear of piston 148 and within the chamber 149, the piston will be moved forwardly within this chamber causing the flanged portion 150 to thrust the pressure plate assembly 151 forwardly to thereby pack the various friction mats and discs of the clutch J to effect direct drive connection between sun gear 80 and driven shaft 70 for causing the planetary train to lock against relative rotation of the members thereof and thereby provide a direct drive connection between driving shaft 64 and driven shaft 70. This forward movement of the piston 148 also causes the flange portion 147 to depress the springs 144 and when the pressure fluid is released at the piston, these springs will restore the piston rearwardly to the Fig. 9 position and, of course, release the clutch J and thereby interrupt or break the direct drive from driving shaft 64 to driven shaft 70.

We will now describe the means for effecting the automatic operation of the direct drive controlling means in response to acceleration of the car in underdrive whereby an automatic step-up is provided in the underdrive mechanism and such description will also include several of the independently operable driver control means for effecting release of the direct drive controlling means.

We preferably effect operation of the direct drive controlling means or clutch J through the medium of pressure fluid supplied to the motor K by means of a pump driven from or with the driven shaft 70 so that when the car is standing still the fluid will not be delivered under pressure to the motor K but so that the pressure fluid will be delivered to this motor whenever the driven shaft has a predetermined desired speed of rotation bearing a desired relationship with the speed of travel of the car.

This pump is designated at L (Fig. 21) and comprises an inner driving member 152 fixed to the driven shaft 70 by the ball fastener 153, this driving member having a plurality of teeth 154, one less in number than the companion internal teeth 155 of the outer driven pump member 156. This general type of pump is well known in the art, the arrangement being such that the inner member 152 rotates with driven shaft 70 thereby also rotating outer pump member 156 and causing fluid to be drawn into the pump suction chamber 157 and delivered under pressure at the pump pressure chamber 158.

The pump is rotatably located between the rear transverse wall 159 of the casing 92 and the pump housing portion 160 of a casting 161 which is secured to the casing wall 159 by suitable fasteners 162. A supply of oil is maintained in the reservoir or sump 163 of the casing 92, this oil being drawn through an intake tube 164 to the suction chamber 165 (Fig. 19) formed in the casting 161, this chamber 165 being open to the crescent-shaped intake chamber 166 for delivery to the pump intake 157. At the pump delivery the pressure fluid is passed from the pump chamber 158 into a crescent-shaped pressure delivery port 167 for delivery of the pressure fluid forwardly through the casting passage 168 whence the fluid divides into two paths or streams respectively leading to the motor K and to an axial bore or passage 169 formed in the driven shaft 70 for distributing the oil for lubricating purposes to the parts of the underdrive mechanism C and also preferably to parts to be lubricated in the change speed transmission D.

Following the path of the pressure fluid from the delivery passage 168 to the motor K, the fluid passes transversely through the passage 170 to the valving means, generally designated at M and from this valving means the oil is delivered transversely inwardly by a passage 171 to a longitudinally forwardly extending groove 172 closed inwardly by a sleeve 173 surrounding the driven shaft 70 and secured thereto against relative rotation. The groove passageway 172 extends forwardly to an annular chamber 174 which surrounds the sleeve 173 and has a plurality of outwardly extending radial passages 175 for delivering the fluid from the annular chamber 174 to the pressure fluid admitting passages 176 formed in the cage 139 and is disposed as to admit pressure fluid into the chamber 149 rearwardly of the annular piston 148. A pair of expanding sealing rings 177 are carried by casting 161 adjacent the radial passages 175 and acting against the cage 139 adjacent passages 176 in order to prevent the escape of the fluid while passing between passages 175 and 176. It will therefore be apparent that rotation of the driven shaft 70 in its normal forward direction will operate the pump L and cause fluid admitted through the intake 164 to be delivered from the pump under pressure to the controlling valving means M thence to the chamber 149 for operating motor K to effect engagement of clutch J to establish the direct drive from shaft 64 to shaft 70.

The valving means M is carried by the portion 178 of the casting 161, this casting portion being formed with a vertical valve receiving bore 179 adapted to slidably receive the valve 180 formed with the bearing heads 181, 182 and the intermediate reduced portion 183 adapted when in the Fig. 19 position to establish communication between passages 170 and 171. The casting portion 178 has a downwardly opening, enlarged bore 184 receiving a coil spring 185 seated by a pin 186 and thrusting upwardly against a washer 187 to urge the valve 180 into its pressure fluid delivery position, illustrated in Fig. 19. This valve has an upwardly extending stem 188 engaged by a finger 189 of a lever 190 pivotally supported at 191 to a bracket 192 carried by a cover member 193 which is secured to the side wall 194 of the casing 92.

The lever 190 has a second finger 195 adapted for engagement by a plunger operator 196 secured to the rear end of a Bowden wire operating mechanism 197, the forward end of which terminates in a knob or handle 198 comprising a driver operated control element mounted in a support 199 at a point for convenient operation by the driver such as at the usual dash or instrument panel 200 (Fig. 1). When it is desired to render the direct drive inoperative, for enabling sustained underdrive through the underdrive mechanism C, the driver pushes the knob 198 to operate the Bowden wire mechanism 197 thereby causing the plunger 196 to move inwardly and engage finger 195 for swinging the lever 190 in a clockwise direction as seen in Fig. 19. This movement of lever 190 causes finger 189 to move the valve 180 downwardly against the spring 185 until the bearing portion 181 of the valve is opposite the casing portion 201 between the passages 170 and 171. This opens the pressure fluid delivery passage 171 to the reservoir 163 and the fluid is free to flow outwardly of passage 171 and upwardly above valve bearing portion 181 for discharge at the upper end of the bore 179 and at the same time the pressure fluid in passage 170 is trapped at the reduced portion 183 of the valve 180 to cut off the pressure fluid supply to passage 171 and the clutch J. When the valve 180 is thus moved downwardly, springs 144 operate to move piston 148 of motor K rearwardly so as to unload the friction discs and plates of the clutch J and at the same time force the pressure fluid in the opposite direction through the system of passages between chamber inlet passage 176 and the passage 171 adjacent valve 180. Any suitable friction or detent means may be employed at any convenient point in the Bowden wire mechanism in order to releasably hold the knob 198 either in the position illustrated in Fig. 1 or in its other position aforesaid for holding the valve 180 downwardly against the restoring action of the spring 185. In Fig. 1 we have illustrated a detent 202 which acts on the Bowden wire mechanism at the housing 199.

We have also provided means for cushioning the restoring movement of valve 180 when the spring 185 acts to move the valve upwardly from the position of shutting off the supply of pressure fluid to clutch J to the valve position illustrated in Fig. 19. This cushioning means comprises a dashpot generally designated at N (Fig. 20). This dashpot comprises a plunger or a piston 203 having a downwardly extending rod portion 204 engaging the upper portion of the finger 189 so that this finger is disposed between valve stem 188 and piston rod 204. The piston 203 carries the flexible seal 205 slidable in the cylinder 206 formed in a cup 207 threaded at 208 within the upper wall of casing 92, the cup having internal threads 209 at its upper end portion 210 for threadedly receiving the abutment plug 211. The cup member 207 is seated at 212 in a recess portion 213 of the casing 92, the abutment 211 serving to yieldingly limit upward movement of piston 203 under the influence of spring 185. Piston 203 and abutment 211 provide an annular air compressing chamber 214 so arranged that when the piston 203 moves upwardly air is trapped at a chamber 214 for regulating and cushioning the upward movement of valve 180 for insuring a smooth engagement of clutch J. The abutment 211 has a depending annular flange 215 adapted to seat against an upstanding companion flange 216 where, between cup 207 and at one or more points, the abutment 211 has a small scratch or groove 217 to provide a restricted communication between the air compressing chamber 214 and a second annular chamber 218 within the portion 210 of the cup member, the chamber 218 being open to the atmosphere through one or more passages 219.

When the underdrive mechanism C operates to effect a change in the drive from the underdrive to the direct drive by the upward movement of valve 180 to the Fig. 19 position, this upward movement of the valve is controlled by the dashpot N to effect a smooth and gradual application of the clutch J to avoid any undesired jolt or shock to the vehicle passengers or operating parts of the power transmission. This dashpot is of a particular significance with respect to the manipulation of the throttle operating mechanism after kick-down, as will presently be more apparent.

The lever 190 is also provided with a downwardly extending finger 220 disposed within the opening 221 of an operating plunger 222 of the electrically energized solenoid O. This solenoid may be of any well known suitable type and is so arranged that when energized the plunger 222 is moved outwardly to swing the lever 190 in a clockwise direction, as viewed in Fig. 19 and thereby move the valve 180 downwardly to cut off the pressure fluid supply to motor K independently of the corresponding operation of valve 180 by the knob 198 so that when it is desired to provide sustained underdrive it is not necessary to maintain solenoid O in energized condition. When the solenoid O is de-energized the spring 185 serves to restore lever 190 and plunger 222 to the positions of these parts shown in Fig. 19 so that the pump L will deliver pressure fluid to the cylinder 149 of the motor K.

The solenoid O is adapted for energization in response to manipulation of a plurality of independently operable driver operated control elements, one of which comprises the aforesaid pedal 129 such that when this pedal is pressed to effect release of the brake means G, the clutch J will also be released.

Referring to Fig. 1, we have provided a switch 223 of any suitable type having an actuating plunger 224 adapted for operation by forward movement of a rod 225 slidably supported in a carrier block 226 secured adjacent the lower end of pedal 129. The rod 225 is formed with a collar 227, a spring 228 acting between block 226 and collar 227 to yieldingly maintain rod 225 forwardly within the limit allowed by a rod pin 229 engaging the rear face of the block 226. The spring 228 provides a yielding connection between block 226 and rod 225 so that when pedal 129 is depressed the rod 225 engages the switch actuator 224 for closing the switch 223 and thereafter the pedal 129 is free to continue its stroke for pumping pressure fluid at the master cylinder 122, the block 226 moving with the pedal to further compress spring 228 and thereby overtravelling the rod 225.

The switch 223 when closed is adapted to complete a circuit for energizing the solenoid O and in Fig. 1 we have diagrammatically illustrated a typical circuit wherein a ground wire 230 leads to the usual storage battery 231 and thence through a wire 232 to the usual ammeter 233. From the ammeter a lead is taken at 234 which extends to one of the contacts 235 of the solenoid O. The other solenoid contact 236 has a wire 237 connected with a contact 238 of switch 223, the other contact 239 thereof connecting through a wire 240 with the terminal 241 of the ground box 242 to complete the circuit for the solenoid operating switch 223.

Another of the aforesaid driver manipulated means for effecting energization of solenoid O is preferably arranged in conjunction with operation of the engine throttle actuating mechanism and preferably in response to driver manipulation of the throttle operating means for an overtravel beyond wide open throttle. Referring particularly to Fig. 1, the engine A is provided with the usual intake manifold 243 having the riser 244 through which the carburetted fuel and air mixture passes for distribution to the engine cylinders under control of the customary butterfly throttle valve 245. This throttle valve is fixed to the upper end of a swinging actuating lever 246 so arranged that when the lever is in a forwardly swung position for wide open throttle, the lever engages a stop 247 to thereby limit further forward swinging movement of lever 246. The lever 246 is adapted for swinging movement to control the opening and closing of throttle valve 245 preferably by the foot operated accelerator pedal 248 pivotally supported at 249 at the toe board structure 250, a spring 251 yieldingly urging pedal 248 upwardly to the throttle closing position.

The accelerator pedal has pivotal connection with the rear end of a link 252 which passes forwardly through the toe-board 250 for pivotal connection at 253 with a lever 254 pivotally supported at 255 for swinging movement. Pivoted to lever 254 is a forwardly extending throttle valve actuating rod 256 which (Fig. 8) slides through an opening of the ear 257 of a bracket 258, this bracket having a forward portion 259 secured to a guide block 260 provided with a rearwardly open bore 261 and having pivotal connection at 262 with the lower end of the aforesaid throttle operating lever 246. The rod 256 has fixed thereto a collar 263 forwardly adjacent the ear 257, a preloaded spring 264 surrounding rod 256 and acting between the block 260 and collar 263 so that normally this spring serves as a connection between rod 256 and block 260. The spring 264 functions as an overtravel spring and during the overtravel of accelerator pedal 248 advises the operator that he is manipulating the accelerator pedal for the kickdown by reason of the extra resistance in addition to spring 251 afforded by this compression of spring 264 when the collar 263 moves toward the block 260. In other words, when the accelerator pedal is manipulated for kickdown, an extra resistance is encountered by reason of compressing spring 264 during operation of the Fig. 8 mechanism which accommodates overtravel of the accelerator pedal beyond its wide open throttle position. The forward end of rod 256 is slidably disposed in the bore 261, the bracket 258 limiting the separating tendency of rod 256 and block 260 under the action of the spring 264.

When the accelerator pedal 248 is depressed to open the throttle valve 245, link 252 operates to swing lever 254 forwardly, rod 256 thrusting block 260 forwardly without relative movement therebetween so as to swing lever 246 forwardly and if the accelerator pedal is depressed to the end of its range of throttle opening movement the lever 246 will engage the stop 247. The accelerator pedal 248 is adapted to have a further range of movement for overtravelling the throttle valve while maintaining the latter in the wide open throttle position and in order to accommodate this overtravelling movement the mechanism illustrated in Fig. 8 comes into action so that forward overtravel of rod 256 will then slide in bore 261 and further compress spring 264 without forwardly moving block 260 or the throttle operating lever 246. Upon release of the accelerator pedal 248, spring 251 assisted by spring 264 operates to restore the parts to the throttle closed positions illustrated in Fig. 1. During this return movement of the parts, rod 256 and the parts between this rod and the pivot 249 are moved relative to block 260 and lever 246 until the collar 263 engages the ear 257 of the bracket 258 and thereafter spring 251 will move rod 256 along with block 260 and lever 246 without lost motion until the throttle valve 245 is restored to the closed position and the accelerator pedal 248 is correspondingly positioned, as in Fig. 1.

The aforesaid overtravelling movement of the accelerator pedal 248 is adapted to effect energization of solenoid O preferably by means which will not restore the valve 180 to the Fig. 19 position until the accelerator pedal 248 is substantially fully released whereby undesired cyclical operations of the valve 180 within minor movements of the accelerator pedal are avoided.

A switch operating lever 265 is adapted to move with the aforesaid lever 254, this lever 265 having a pair of switch operating fingers 266 and 267 alternately engageable with the swinging operating element 268 of an electrical switch 269 preferably of the well known snap-over type provided with the contacts 270 and 271. In the fully released position of accelerator pedal 248, as in Fig. 1, the finger 266 has operated the switch element 268 so that the switch is open and when the accelerator pedal is depressed to the limit of its aforesaid throttle opening range of movement, the finger 267 has been swung upwardly about the lever support 255 and into engagement with the forward face of switch element 268. When the accelerator pedal is depressed for the aforesaid overtravelling range of movement, the finger 267 then swings the switch operating element 268 in a counterclockwise direction to cause this element to have the usual snap action in closing the switch. When the accelerator pedal is released to the wide open throttle position, finger 266 does not then engage switch element 268 for restoring the switch to the open position, this finger 266 engaging the switch element by preference when the accelerator pedal nears the end of its fully released position such that the last portion of the releasing movement of the accelerator pedal is utilized for causing finger 266 to swing in a counterclockwise direction and effect the snap-over switch opening movement of the element 268 in restoring the parts to the Fig. 1 position.

The contact 270 is connected by a wire 272 with the ground terminal 273 at the ground box 242, the other switch contact 271 being connected through a wire 274 with the aforesaid terminal 236 of solenoid O so that when switch 269 is closed a circuit will be completed through the wire 234, ammeter 233 and ground wire 230.

It will therefore be apparent that we have provided what may be termed a kick-down control for the underdrive mechanism C so that when a driver desires to effect release of the direct drive and drive in the underdrive, he has only to depress the accelerator pedal 248 through the kick-down throttle overtravelling range of movement thereof to operate switch 269 and effect energization of solenoid O which, in turn, will operate valve 180 downwardly to cut off the supply of pressure fluid to motor K and at the same time vent cylinder 149 to the reservoir 163 to release the clutch J. The drive will then take place through the underdrive planetary gearing and when the driver releases the accelerator pedal to substantially the fully released position, the switch 269 will be opened to deenergize solenoid O whereupon spring 185 will restore valve 180 to the Fig. 19 position for supplying pressure fluid to motor K and effect operation of clutch J to produce the step-up or direct drive from drive shaft 64 to driven shaft 70.

When the solenoid O is deenergized, as aforesaid, the dashpot N comes into action to cushion the restoring operation of valve 180 so that clutch J is engaged with smooth action during the step-up of the speed ratio drive in the underdrive mechanism.

When the underdrive is in operation the sun gear 80 is prevented from backward rotation by the overrunning control device F, as aforesaid, it being apparent that when clutch J is engaged the planetary train is caused to rotate forwardly as a unit with driving shaft 64 and driven shaft 70 and the sun gear 80 thereupon automatically releases at the overrunning control device F. When the clutch J is engaged for effecting the direct drive, the kick-down control by the accelerator pedal is of advantage especially where the driver desires to quickly pass another vehicle on the road or at times when the driver desires power application from the engine A through torque multiplying gearing which is afforded by the planetary underdrive train. The kick-down control at the accelerator pedal 248 is therefore a control which is responsive to the natural impulses of the vehicle driver under the circumstances in that there is a natural tendency to depress the accelerator pedal under the aforesaid conditions. Thus when the accelerator pedal is fully depressed, the kick-down control is brought into operation to release the clutch J and since the throttle valve 245 is then in the wide open position, the engine A immediately speeds up by an amount corresponding to the ratio of the underdrive gearing and is limited by operation of the overrunning control device F in arresting the then tendency of sun gear 80 to rotate backwards. When the accelerator pedal is released sufficiently to de-energize solenoid O in restoring clutch J to its engaged condition, this clutch engagement picks up the sun gear 80 until it is caused to rotate at the same speed as that of driven shaft 70 in restoring the direct drive from shaft 64. The same operation of the change speed gearing of underdrive mechanism C takes place when the dash control knob 198 is manipulated by the vehicle driver although, as aforesaid, this control is preferably independent of solenoid O so that when it is desired to drive the car in sustained underdrive, it is not necessary to utilize electrical current. However, it is also of advantage in the event that the dash control knob 198 is left in the underdrive position when the car is left standing since it does not run down the battery 231.

In order to disconnect the drive from driving shaft 64 to driven shaft 70 either when the vehicle is standing still with the engine idling or during car running conditions, the driver may depress pedal 129 to simultaneously energize solenoid O to effect release of clutch J and also to pump pressure fluid from master cylinder 122 to effect operations of the motors H and thereby release the braking means G.

We will now describe the means for regulating or governing the supply of pressure fluid from pump L to the motor K in order to determine the engagement of clutch J as a function of the speed of driven shaft 70 as well as the car driving speed thereby also determining the time element in the automatic step-up from underdrive to direct drive when the car is started from standstill. By way of example, this part of the system may be so arranged that the car will be accelerated in underdrive until the same attains a speed in the neighborhood of 20 miles an hour at which time the pump L will be pumping fluid in sufficient amount to produce the pressure necessary to engage clutch J. Obviously, if desired, the functional operating characteristics of the system for controlling operation of clutch J may be varied as desired, our preference being to effect engagement of clutch J at a relatively low car speed thereby obtaining the benefits hereinbefore set forth, in connection with the use of the direct drive through the underdrive mechanism C when the car is operated for ordinary city driving as well as for country driving. The differential mechanism E at the driving rear axle preferably provides a relatively fixed drive between the propeller shaft 50 and the driving ground wheels 52, as aforesaid, and with such an arrangement a direct drive condition in the mechanisms C and D will provide an overall drive from the engine A to the ground wheels 52 of a character generally equivalent in overall speed ratio to present commercial types of overdrive power transmission systems. In view of the arrangement for convenient and fast operating kick-down from a direct drive to underdrive in the mechanism C, the desired performance of a car for city driving and obtaining rapid acceleration is not lost in comparison with more conventional present day car performance. Inasmuch as when the kickdown is operated and where the change speed transmission D is set for a direct drive, the overall speed ratio from engine A to ground wheels 52 in the preferred arrangement of our system is then, generally speaking, approximately equivalent to a direct drive setting of a standard transmission in the type of motor vehicle most commonly used at the present time.

Referring to Figs. 9, 17 and 19, the pressure fluid delivered by pump L into the passage 168 of casting 161 divides into two streams, one of which leads outwardly as aforesaid in the passage 170 and the other of which leads inwardly in the passage 275 for entry in the arcuate groove or chamber 276 which only partially surrounds sleeve 173. The casting 161 is formed with an upwardly extending boss 277 terminating at its upper end closely adjacent the underface of a boss 278 formed with casing 92 and having an outwardly extending opening 279 threadedly receiving an abutment closure member 280.

The boss 277 is formed with a bore 281 which extends radially outwardly with respect to the axis of driven shaft 70 co-axially with the casing opening 279. The lower end of bore 281 is provided with the neck portion 282 thereby forming the valve seat 283, this neck portion communicating with the upper end portion of the pressure fluid conducting chamber 276. Slidably disposed in bore 281 is a valve member 284 formed with the reduced portion 285, this valve being urged downwardly against seat 283 by a coil spring 286 having its upper end thrusting against the abutment member 280. The valve 284 is provided with an axial fluid metering passage 287 communicating at its lower end with the neck portion 282 of the pressure fluid conducting system, the passage 287 extending upwardly through the axis of valve 284 and has its upper end extending transversely of the axis of valve 284 for communication with the valve chamber 288 which surrounds the reduced valve portion 285.

When the valve 284 is seated downwardly, as in Fig. 19, the valve chamber 288 communicates with an outwardly extending casting passage 289 which is formed with a downward extension 290 terminating in the groove 291 adjacent sleeve 173. This groove 291 communicates with the aforesaid lubricant conducting shaft bore 169 through the radially aligned shaft and sleeve passages 292 and 293, respectively.

When the vehicle engine is first started up and with the power transmission manipulated to disconnect the engine from the ground wheels 52, by means which will presently be more apparent, the engine when idling will drive shaft 70 in underdrive from shaft 64 assuming that the idle is sufficiently fast to cause the fluid coupling runner 58 to be rotated by the impeller 55. With the engine so operated to impart drive to shaft 70 and with the change speed transmission D set for neutral, the pump L will start delivering relatively small quantities of fluid from reservoir 163 under a relatively low pressure insufficient to cause engagement of clutch J. Furthermore, the arrangement is such that the pressure does not build up under such conditions because the metering passage 287 in valve 284 delivers the fluid from the pump to the shaft bore 169 so that the fluid is used for lubricating purposes by distribution from bore 169 in order to lubricate the running parts of mechanisms C and D which require lubrication. When it is desired to initially accelerate the vehicle, then the change speed mechanism D is manipulated for a forward drive, for example, and the engine throttle 245 is opened in the customary manner to increase the power delivery of engine A and the vehicle is accelerated from standstill with the underdrive operating to rotate driven shaft 70 forwardly from driving shaft 64 and at a relatively slower speed. As the speed of rotation of shaft 70 increases, the pump L delivers a proportionately increasing amount of fluid and one function of valve spring 286 and metering passage 287 is to determine the conditions under which pressure fluid will build up sufficiently to effect operation of motor K and engage clutch J to automatically step-up the drive through the underdrive mechanism C. It will be apparent that by suitably proportioning the strength of spring 286 in relationship with the metering passage 287 when the latter is employed, it is possible to provide for operation of the direct clutch J at the aforesaid car speed of approximately 20 miles per hour or at any other car speed which may be desired.

As the pressure fluid delivery increases, the pump delivers more pressure fluid than can pass through the metering passage 287 and the valve 284 will then begin to move upwardly, further compressing spring 286 until the neck portion 282 communicates passage 289 with the valve 284 having then raised sufficiently to establish this communication. When the pump pressure builds up sufficiently to operate clutch J then any excess pressure causes valve 284 to move further upwardly permitting additional quantity of fluid to escape from chamber 276 to passage 289 for delivery to the shaft bore 169. The valve 284 therefore functions as a pressure releasing valve in addition to the functions thereof for regulating or governing the operation of clutch J.

By arranging the upper end of boss 277 closely adjacent the underface of boss 278, the abutment member 280 may be removed for replacing spring 286 and valve 284 without danger of the valve dropping between bosses 277 and 278 and falling down into the mechanism within casing 92. This arrangement also conveniently provides for substituting a spring in place of the spring 286 for changing the operating functions of the pressure fluid delivered by pump L; also for substituting other valves in place of valve 284 having differing capacities of metering passages 287 for generally similar variations in the functions of pressure fluid delivery and the operation of clutch J.

The provision of metering passage 287 also insures constant delivery of the fluid from lubricating surfaces of the shaft bore 169 whenever the driven shaft 70 is rotating, the oil passing forwardly in the shaft bore from the delivery passage 292 for distribution to outlet passages 294, 295, for example. In Fig. 1 the shaft outlet passage 295 delivers the oil to a chamber 296 between shaft 70 and sun gear extension 81, the oil then flowing outwardly through one or more ports 297 formed in the extension 81 for delivery of the oil to the underdrive planetary gearing, the overrunning control device F, braking means G, and the various thrust bushings and miscellaneous parts of the mechanism C.

The oil delivered outwardly through passage 294 divides so that a portion of the oil escapes rearwardly along the splines 140 while another portion extends radially outwardly in a groove 298 at the front of cage 139 for discharge outwardly toward the friction elements of clutch J whereby wear of the surfaces of the clutch is minimized especially during operation of mechanism C when this clutch J is not engaged. In order to further supply oil to the working parts of clutch J, the oil delivered rearwardly as aforesaid along splines 140 is conducted radially outwardly by one or more passages 299 formed in cage 139 for delivery of the oil into the associated spring-receiving cage 143 from whence the oil passes outwardly through an associated passage 300 at the cage splines 138.

In the event that a change speed transmission is employed to receive the drive from driven shaft 70, as preferred, we have also provided a further control of solenoid O so arranged that this solenoid will be energized by the driver operated means for manipulating the change speed transmission D for the duration of the manipulated operation whereby it is not necessary for the driver to manually depress pedal 129 in releasing the drive to the change speed transmission in order to accommodate manipulation of transmission D without clashing the shiftable clutches or gears ordinarily used in change speed devices. When the car is at a standstill, then release of clutch J is often not sufficient to release driven shaft 70 from driving shaft 64 because the drag effect through the fluid coupling B tends to rotate driving shaft 64 and the sun gear 80 is automatically held for reaction by the overrunning device F, thereby producing a forward rotation of driven shaft 70 even though clutch J is released. Therefore, the pedal 129 is preferably depressed when change speed transmission D is manipulated to a forward or reverse drive in order to initially accelerate the car, this having the effect of releasing brake G as well as clutch J. If it is desired to substitute an ordinary plate type friction clutch in place of the fluid coupling B, then release of such clutch will, of course, interrupt the drive between engine A and driving shaft 64 rendering it unnecessary to provide any means for releasing the outer member 87 of the overrunning device F, as will be readily understood.

When the vehicle is being driven forwardly under normal driving conditions, the pump L will supply pressure fluid to operate the clutch J and for manipulations of the change speed transmission D under such conditions it is not necessary to effect release of the brake G because sun gear 80 is carried forwardy and is therefore overrunning the control device F making it desirable to only release clutch J when the vehicle is running forwardly.

We have preferably provided a change speed transmission D having a plurality of forwardly driving speed ratios and a reverse drive between driven shaft 70 and the tail shaft leading from transmission D and more particularly we have arranged this change speed transmission D to provide a selectively operable reduction drive and a direct drive. In view of our arrangement whereby the clutch J is disengaged when the vehicle is at a standstill and whereby the planetary underdrive of mechanism C automatically operates to initially accelerate the vehicle in a reduction drive, the driver may manipulate the reduction drive of transmission D in starting the vehicle and thereby obtain a double reduction operable until clutch J automatically responds to predetermined vehicle speed to step-up the speed ratio drive in mechanism C while, if desired, maintaining transmission D in the reduction drive. Then, in order to obtain a still faster drive such as direct through the entire power transmission, the driver may manipulate the transmission D for a direct drive therethrough and by stepping-up the drive in transmission D. As will presently be more apparent, the mechanisms C and D therefore provide, in fact, four forward speed ratios including a compound reduction drive through the reduction gearing of both mechanisms, a single reduction drive through mechanism C with mechanism D operating in direct, a single reduction drive through mechanism D with mechanism C operating in direct, and also a direct drive with both mechanisms operating in direct. In addition the mechanism D may be manipulated for a reduction reverse drive which is arranged for compounding with the underdrive through mechanism C and, by an appropriate setting of the pressure fluid build-up as will presently be more apparent, the power transmission will operate to automatically step-up the driving mechanism C for a direct drive therethrough during reverse in view of the fact that pump L is driven from driven shaft 70 which always has a forward direction of rotation so that the pump L is not reversely driven when the vehicle is driven in reverse.

The change speed transmission D is preferably arranged for convenient manipulation by a driver operable remote control mechanism located for convenient manipulation. We will now describe this remote control operating mechanism, certain features of which are disclosed and claimed in the co-pending application of Frederic W. Slack, Serial No. 304,570, filed April 27, 1938.

Referring particularly to Figs. 1-7 and 11-15, the vehicle illustrated is provided with a stationary steering post or column 301 adapted to mount a vehicle steering wheel 302 for steering the front ground wheels (not shown) of the motor vehicle in any desired well known manner, the steering movement from wheel 302 being transmitted downwardly and forwardly by the hollow shaft 303 which is disposed centrally within the outer column 301. This column at its upper end mounts a housing structure formed in two portions 304 and 305 secured together by fasteners 306 and at the right hand portion of this housing structure, as viewed by the vehicle driver, the housing portions are separated to provide arcuate fulcrum surfaces 307 and 308 respectively, the surface 307 being fitted with a fulcrum detent plate 309. The arcuate opening 310 thus formed between the aforesaid housing portions accommodates shifting movements of a driver actuated selector element 311 in the form of a lever extending transversely to the axis of the steering column 301 and having its inner end formed with a yoke 312 pivotally secured by the trunnion pins 313 with the tubular member 314 which forms a rigid part, as by welding, with a hollow operating shaft 315 coaxially disposed between column 301 and the central shaft 303. The selector lever 311 is provided with an intermediate rounded fulcrum portion 316 adapted to rock in contact with abutment plate 309 and the abutment 308. If desired a detent mechanism 317 may be provided for co-operation with abutment plate 309 to yieldingly assist in location of the shift lever 311 in the positions of shift thereof, as will be presently more apparent.

In the drawings the selector lever 311 is illustrated in its neutral position from which the selector element is shiftable to a plurality of predetermined stations of transmission control and in the present embodiment of our invention we have provided a change speed transmission D which is arranged for a reduction drive, a direct drive, and a reverse drive. When the selector element 311 is shifted forwardly from the neutral position (see Figs. 2 and 4) the lever will rotate about the axis of column 301 until it occupies the position indicated at 311' which is the station positioning for effecting the low speed drive through transmission D. During this shifting movement of the selector element the shaft 315 will be rotated in a counterclockwise direction when looking down from above the steering wheel, this being a clockwise direction as viewed in Fig. 7.

A shifting movement of selector element 311 rearwardly to the station of position indicated at 311" will manipulate transmission D for a direct drive and operates to rotate shaft 315 in a direction opposite to that aforesaid when shifting to the low speed position 311'. When it is desired to manipulate transmission D for a reverse drive the driver first pulls upwardly on selector element 311, when in the neutral position to swing the lever about its fulcrum 316 in the general direction of the axis of column 301, this shifting movement being accompanied by a downward shift of the shaft 315. The operator then thrusts the selector element forwardly to the station position indicated at 311''', this being the position of the selector element for manipulating the transmission D or a reverse drive of the vehicle. The path of shifting movement of the selector element to its various stations of transmission control is therefore substantially H-shaped although since we have provided only two forwardly driving speed ratios, one of the legs of the H-path is omitted.

At the lower end of shaft 315, the shaft has fixed thereto a laterally extending lever 318 having its underface engaged by a plunger 319, the lever 318 at said engagement being arcuately flared at 320 so that the plunger 319 maintains engagement with lever 318 within the limits of rotational adjustment of shaft 315 in response to shift of selector element 311 between its aforesaid stations. Welded to the lower end of shaft 315 or otherwise rigidly secured thereto is an arcuate switch operating segment 321 having three axially extending grooves 322, 323 and 324 formed in the underface of the segment and adapted for selective engagement with the rounded end portion 325 of a switch-operating plunger 326 slidably mounted in the bore 327 of the housing 328.

The groove 323 is engaged by plunger 326 when the selector element 311 is at its neutral station, groove 324 being engaged by the plunger when the selector element occupies the direct drive position 311" while groove 322 is engaged by the plunger when the selector element is shifted either to the low speed position or the reverse drive position 311' or 311''', respectively. When the shaft 315 is shifted in the direction of its axis as when the selector element is rocked about its fulcrum 316 and shifted to reverse, the plunger 326 will maintain engagement with the groove 323 during the upward movement of selector element 311 and when the selector element is disposed at its reverse drive control station 311'''. The upper end portion of the groove 322 will then be engaged by the plunger 326.

The plunger 326 has its outer rounded end portion 329 engaged in a correspondingly-shaped socket and the swinging switch element 330 having its body portion formed of insulating material such as hard rubber and being provided with an annular conductor 331 adapted to bridge the contacts 332 and 333 of the electrical switch, generally designated at 334. A relatively heavy spring 335 yieldingly maintains the switch open as in Fig. 7 at which time the plunger 326 is engaged with one of the aforesaid grooves of the segment 321, a relatively light spring 336 assisting in yieldably urging plunger 326 inwardly. When the shaft 315 is rotated in either direction from its neutral position, the first part of this rotation will be attended by outward movement of plunger 326 as the rounded end portion 325 thereof rides out of the groove 323. The outward plunger movement operates to swing the switch element 330 outwardly about a fulcrum provided by the annular conductor 331 at the inner end of contact 333 thereby causing the conductor 331 to engage the other contact 332 for establishing a circuit through the switch 334. When the selector element reaches any of its stations of transmission drive control, the plunger 326 will then move inwardly into engagement with one of the grooves of segment 321 whereupon spring 335 will swing the switch element 330 into the Fig. 7 position to open the circuit through switch 334.

The contact 332 is connected through a wire 337 with the terminal 338 of the ground box 242 while terminal 333 is connected through conductor wire 338' with the aforesaid terminal 236 of solenoid O. It will therefore be apparent that we have provided means responsive to driver manipulation of selector element 311 for energizing solenoid O whenever the selector element is being manipulated between its various stations of transmission control and for de-energizing the solenoid whenever the selector element is disposed at one of these stations. This operates to effect disengagement of clutch J during shifting operations of selector element 311 so that the drive is automatically released from mechanism C to mechanism D during shifting operation of the selector element 311 in order to facilitate manipulation of the shiftable clutches or gears or other control parts of the change speed transmission D without objectionable noise or damage to such parts. It will furthermore be apparent that this energization of solenoid O in response to shift of selector element 311 is independent of the aforesaid driver operation controls for energizing the solenoid by manipulating accelerator pedal 248 or by depressing the pedal 129.

The plunger 319 is secured to the forward end of a Bowden wire mechanism 339 and is yieldingly maintained in engagement with the flared portion 320 of lever 318 by a coil spring 340 disposed within the housing 341 for slidably guiding the plunger. This Bowden wire mechanism is adapted to control the manipulation of transmission D selectively for the forward speed ratio drives when the plunger occupies the Fig. 6 position or for the reverse drive when downward displacement of shaft 315 causes plunger 319 to move downwardly in the housing 341. The lever 318 is adapted to effect manipulation of the forward and reverse drive control means under the selective control by the Bowden wire mechanism 339.

At the outer end of lever 318 there is pivotally secured a rearwardly and downwardly extending link 342 which is pivoted to the arm 343 of a bell-crank lever 344 having a rocking support at 345, the other arm 346 of the bell-crank lever being pivotally connected to the upwardly and rearwardly extending link 347. The rear end of link 347 is pivotally secured to a lever 348 fixed on a rock shaft 349, this shaft extending transversely within the side of transmission D for journal support in the transversely spaced journals 350 and 351 of a cover plate 352 secured by fasteners 353 to the side wall 354 of the transmission. At its inner portion the shaft 349 is formed with splines 355 slidably engaged by corresponding splines on the shiftable selector operating sleeve 356, the latter having a flared finger 357 engaged at all times with the inner end of a plunger 358 which is carried at the rear end of the aforesaid Bowden mechanism 339. The plunger 358 is slidable in the housing sleeve 359, as best illustrated in Fig. 14.

Welded to the sleeve 356 just forwardly of the shift finger 357 are a pair of oppositely extending levers 360 and 361 respectively and selectively engageable in the openings 362 and 363 of the shift blocks 364 and 365. The block 364 engaged by the upwardly extending lever 360 is fixed at 366 with a forward speed controlling shift rail 367 while the block 365 which is engaged by the downwardly extending lever 361 is likewise secured at 368 with a reverse drive controlling shift rail 369.

Figures 14, 15:
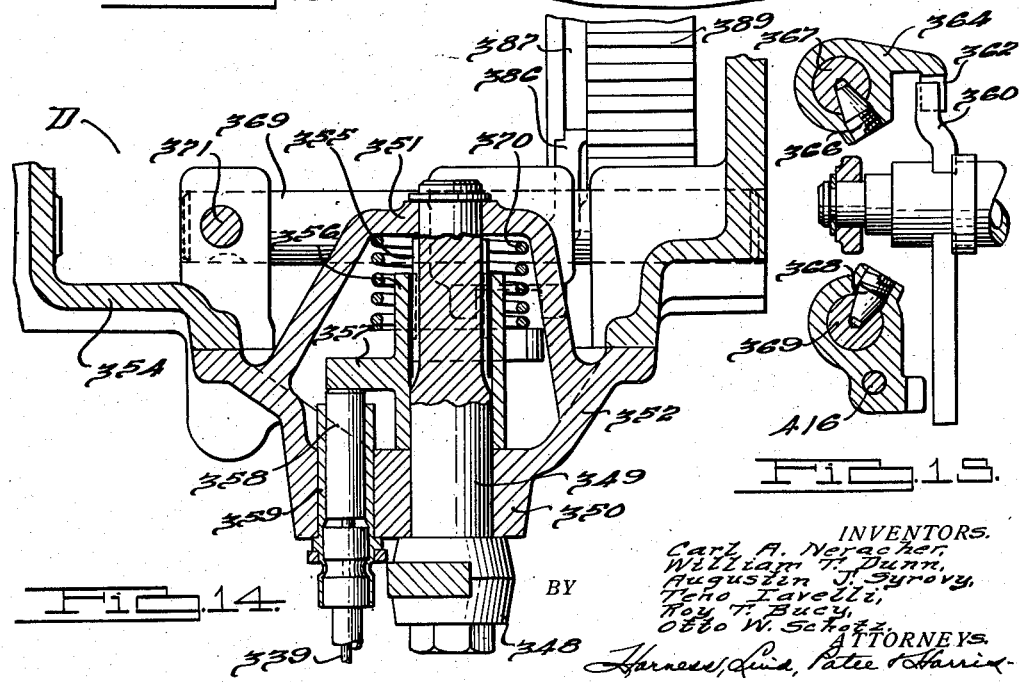
Fig. 14 is a sectional top view taken along line 14—14 of Fig. 13.
Fig. 15 is a detail sectional elevational view taken as indicated by line 15—15 of Fig. 13 and looking to the rear.
Figure 26:
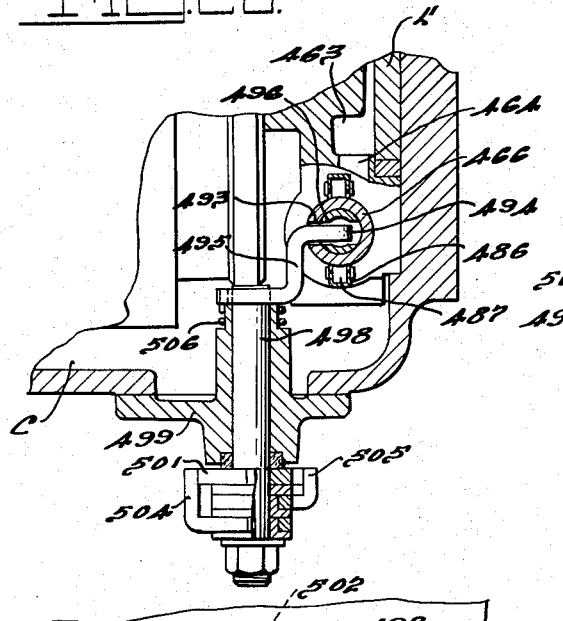
Fig. 26 is a detail sectional plan view taken along line 26—26 of Fig. 24.
Figure 27:
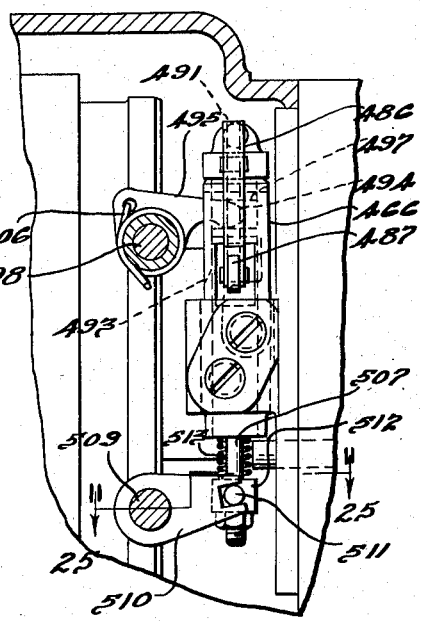
Fig. 27 is a sectional elevational view taken along line 27—27 of Fig. 24.
Figure 28:
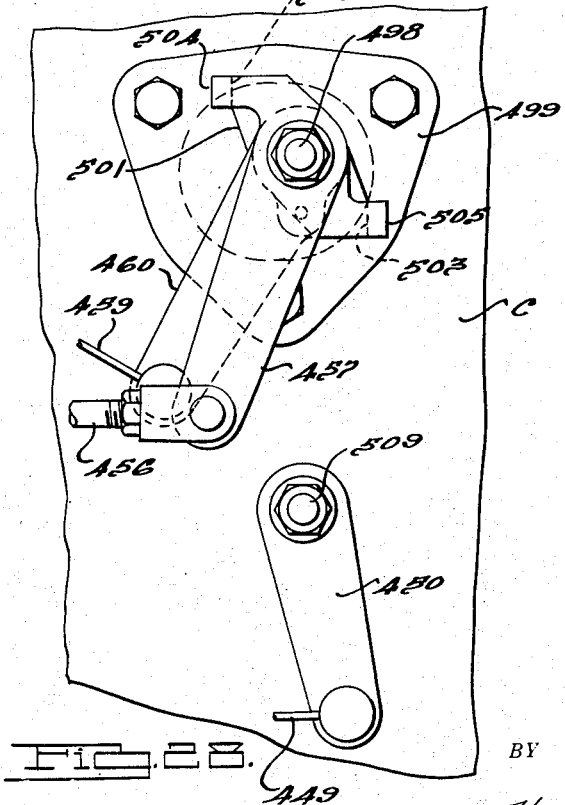
Fig. 28 is a side elevational view taken as indicated by line 28—28 of Fig. 24.

A spring 370 operates to yieldingly urge sleeve 356 outwardly so that with the selector element 311 in its neutral position, the lever 360 will engage the opening 362 of the block 364, as illustrated in Figs. 13 and 15. When the selector element 311 is shifted from neutral along the aforesaid path for disposition at the reverse control station 311''', the accompanying downward thrust of shaft 315 operates through lever 318 and Bowden wire mechanism 339 to move the sleeve 356 inwardly along the splines 355 against the action of spring 370, thereby shifting lever 360 inwardly free from engagement with the opening 362 of block 364 and bringing the lower end of lever 361 into engagement with the opening 363 of the block 365.

A system of interlocking and detent controls is preferably provided in operable association with the rails 367 and 369 whereby only one of these rails may be shifted at any time and requiring the selector element to be moved back to its neutral position in shifting one rail before the other rail can be operated. The interlock is shown in Figs. 12 and 13 and comprises an interlock plunger 371 cooperating with the rail recess 372 and 373 so that when either rail is moved from its illustrated neutral position, the other rail is held against shifting movement by the plunger 371.

The forward drive rail 367 is provided with a series of grooves 374, 375 and 376 respectively engaged with a ball detent 377 urged by a spring 378 (Fig. 12) when the rail is respectively positioned for neutral, the reduction forward drive speed ratio and the forward direct drive speed ratio. The reverse drive control rail 369 is likewise provided with a neutral groove 379 and a groove 380 adapted for engagement with the detent ball 381 urged by spring 382 when the rail 369 is shifted forwardly to establish the reduction reverse drive through the transmission D.

The block 364 carries a shift yoke portion 383 which is disposed within the groove 384 of the shiftable low speed and direct drive clutching element 385, the other block 365 being provided with a shift yoke 386 engaged within the groove 387 of the shift extension 388 carried by the reverse idler gear 389 rotatably journalled on the idler countershaft 390.

The drive from the underdrive mechanism C is taken to the change speed transmission D by the intermediate or driven shaft 70 and the drive is taken from transmission D by a tail shaft or output driven shaft of this transmission. The tail shaft is adapted for rotation selectively in the forward direction of rotation of driven shaft 70 and the tail shaft 391 is adapted to transmit the drive to the ground wheels 52 in any desired manner such as through the usual universal joints (not shown), and rear axle sections 51 (Fig. 1A). In Fig. 11 we have illustrated the usual brake drum 392 adapted for engagement by the usual brake means (not shown) for use as an emergency or parking brake and if desired the tail shaft 391 may have an extension 393 rearwardly beyond the drum 392.

The driven shaft 70 has its rear portion journalled by a bearing 394 in the casing 395 of transmission D, this shaft carrying the countershaft driving pinion 396 and being provided with direct drive clutch teeth 397 and the synchronizing friction cone surface 398 for synchronization operation with a companion friction clutching element 399 preferably having the blocker teeth 400 adapted to obstruct forward shift of the clutching teeth 401 of the shift sleeve 385 when the latter is shifted forwardly to engage teeth 397 to establish the direct drive through transmission D. The particular type of blocker synchromesh structure illustrated in Fig. 11 is more particularly described and claimed in the copending application of Otto E. Fishburn, Serial No. 180,840, filed December 20, 1937. The shift sleeve 385 has its teeth 401 slidably engaging corresponding teeth 402 of the hub structure 403 fixed by the splines 404 with the forward end portion of tail shaft 391 which is rotatably journalled by the bearing 405 within the hollow rear end portion of shaft 70. An expansion friction ring 406 frictionally engages the teeth 401 of shift sleeve 385 and releasably urges the synchronizing ring 399 against the friction surface 398 when the sleeve is shifted forwardly to produce the blocking synchronizing action between the shafts 70 and 391 whereby the sleeve teeth 401 cannot be moved into positive clutching engagement with teeth 397 until the shafts are brought into synchronized action as more particularly described in the aforesaid Fishburn application. If desired, other forms of synchronizing means may be employed or the shaft member may be arranged for clutching action without synchromesh.

A similar synchronizing blocker ring 407 is disposed at the rear of hub 403 for controlling the rear shift movement of sleeve 385 to synchronized low speed gear 408 with tail shaft 391 prior to engagement of the shiftable clutch teeth 401 with the teeth 409 carried by gear 408, the latter being loosely journalled on the tail shaft and adapted to transmit the low speed forward drive to the tail shaft when the shift sleeve 385 is clutched to shift teeth 409, aforesaid.

The gear 396 is in constant mesh with the countershaft cluster drive gear 410 journalled on the countershaft 411, the cluster having the further countershaft gears 412 and 413. The gear 412 is in constant mesh with the low speed drive gear 408 and gear 413 provides a reverse countershaft drive pinion adapted for engagement with the reverse idler gear 389 when the latter is shifted forwardly into mesh not only with gear 413 but also with the reverse drive gear 414. The latter gear is preferably fixed by splines 415 on the tail shaft 391, it being preferred to arrange this gear against axial shifting movement and instead to shift the reverse idler gear 391 forwardly since this arrangement provides for quieter running in the forward drives at which time the reverse gearing is not in mesh. This further simplifies the manufacture of the gears, eliminates shaft helical splining and the practical necessity for helical gears, thereby considerably simplifying and cheapening the transmission.

In the operation of the transmission D, let it be assumed that the vehicle driver desires to manipulate this transmission for the forward low speed drive which is effected by shift of the selector element 311 forwardly to the stationed position 311' (shown in Fig. 4). This operates the remote control mechanism previously described and causes lever 318 to push downwardly on the link 342 thereby swinging lever 348 in a clockwise direction, as viewed in Fig. 1. This operates the rock shaft 349 to cause the lever 360 to shift rail 367 rearwardly, thereby shifting the teeth 401 with synchronizing action into positive clutching engagement with the teeth 409 of the low speed drive gear 408. The springs 370 and 340 yieldingly maintain lever 360 in engagement with the opening 362 of block 364 when the transmission is in neutral and the plunger 319 is yieldingly maintained in engagement with lever 318 so that during the shift from neutral to low speed drive the plunger 319 is not moved in the direction of its axis but merely has sliding engagement with lever 318. It is only during the reverse shift that the plunger 319 has sliding movement in the housing 341.

In shifting to the direct drive the selector element is moved from neutral to station 311'' without any axial displacement of sleeve 356, the rail 367 being shifted forwardly to engage clutch teeth 401, after the synchronizing action, with the direct drive clutch teeth 397 thereby to directly drivingly connect shaft 70 with tail shaft 391.

In selecting for the reverse drive, the driver moves the selector element to the reverse station 311''', the first part of the shift path rocking the selector element on its fulcrum 316 causing the shaft 315 to move downwardly and thereby operate Bowden wire mechanism 339 to shift sleeve 356 inwardly to disengage lever 360 with block 364 and effect engagement of lever 361 with opening 363 of block 365. The second part of the reverse shifting path of the selector element, viz., when the selector element is swung forwardly about the axis of steering column 301, causes the rock shaft 349 to rotate in a clockwise direction, as viewed in Fig. 13, thereby displacing rail 361 forwardly to bring the reverse idler gear 389 into mesh with gears 413 and 414 to establish the reverse drive from shaft 70 to the tail shaft 391. In order to provide a further guide support for the block 365, we have provided a guide rail 416 which passes through block 365 and slidably receives the block (Figs. 12 and 13).

In the operation of the power transmission mechanism as a whole, we will assume that the selector element 311 is positioned for neutral and that the engine A is not operating, this being the condition of the parts when the car is parked.

We will further assume that the power transmission system incorporates a fluid coupling B and that the dash knob 198 is in the Fig. 1 position so that the valve 180 and parts associated therewith are positioned as in Fig. 19, this being the preferred normal condition of the parts when the vehicle is left standing.

When it is desired to drive the car forwardly, the fluid coupling offers such advantages of car acceleration that in many instances it will be found preferable to start the vehicle with the change speed transmission D operated for direct instead of for the low speed drive. However, for illustrating the various functions of the mechanism we will describe a start of the vehicle with transmission D set for its low speed forward drive, this drive affording greater torque multiplication, of course, than where the car is accelerated in direct.

The engine A is started in the customary manner, transmission D still being in neutral, and since shaft 70 usually offers resistance to forward rotation even with transmission D in neutral, the engine will have a tendency to drag the fluid coupling runner 58 forwardly especially where the engine is turned over more rapidly than its normal slow idler, as is customary in the engine start-up, the runner 58 will rotate the annulus gear 72 and since the carrier 77 tends to remain stationary, sun gear 80 will have a tendency to rotate backwards but will be prevented from this rotation by wedging operation of the rollers 85 of the overrunning control device F. Therefore the shaft 70 will have a very slow forward rotation, ordinarily making it advisable to momentarily release sun gear 80 by the brake G when the transmission D is shifted from neutral for initially accelerating the car.

The driver therefore will use pedal 129 as an ordinary clutch pedal, although it is only necessary to use this pedal when getting the car started from standstill. The driver therefore depresses clutch pedal 129 to operate master cylinder 122 and thereby release brake G allowing sun gear 80 to rotate backwards, the overrunning device F being thereby rendered ineffective and the driver then shifts selector element 311 from neutral to the low speed station 311 to effect engagement of clutch teeth 401 and 409. Depressing pedal 129 will also cause the switch 223 to energize solenoid O but since the clutch J will normally be disengaged under the start-up conditions, the energization of the solenoid is not at this time a necessary function since ordinarily pump L will not be delivering fluid at sufficient pressure to effect operation of the motor K. The driver then releases pedal 129 and at the same time depresses accelerator pedal 248 in order to speed up the engine and the brake G will smoothly engage to arrest backward rotation of sun gear 80 so that the vehicle will start its initial forward acceleration through the planetary underdrive gearing compounded with the low speed gearing of transmission D.

As the car accelerates and reaches the predetermined desired speed bearing the desired relationship with the speed of driven shaft 70 from which the pump L is driven, the fluid delivered by the pump will have reached the point where the pressure fluid is sufficient to operate motor K and thereby smoothly engage clutch J in response to the acceleration of the car. As the clutch J engages, the stationary sun gear 80 is picked up and rotated forwardly until when the clutch is fully engaged it will have forward rotation at the same speed as that of the driven shaft 70 and, as aforesaid, the planetary underdrive train will be locked up to rotate as a unit to provide the forward drive through the mechanism C although it will be noted that it is not necessary for the driver to change the condition of transmission D in order to realize the automatic step-up in the speed ratio effected by engagement of clutch J. The forward rotation of sun gear 80 is provided by the automatic release of the sun gear at the overrunning device F while maintaining the brake G in engaged condition.

The car is now driving in what may be termed its second speed, the low speed being the compound reduction drive through the underdrive of mechanism C and the low speed drive of transmission D, and when it is desired to again step-up the speed ratio the driver has only to manipulate selector element 311 from station 311' rearwardly to station 311'' in order to effect the direct drive in transmission D, it being customary when manipulating the transmission D to release the accelerator pedal in accordance with the standard practice of making speed ratio changes in cars equipped with conventional change speed transmissions. When the selector element is first moved rearwardly from the low speed stations 311', switch 334 is closed and remains closed until the selector element reaches the station 311'' at which time the switch opens. When the switch closes solenoid O is energized thereby immediately releasing clutch J and since the shaft 70 was rotating forwardly just prior to the manipulation of selector element 311 it will be obvious that it is not now necessary for the operator to depress pedal 129 in shifting the selector element in this assumed example operation. Release of the clutch J breaks the drive from shaft 70 to transmission D and therefore the clutch teeth 401 may be readily synchronized and engaged with teeth 397 without a great amount of effort and without clashing or danger of destruction to the clutch teeth or other parts of the power transmission. When the selector element reaches station 311'' and the switch 334 opens, solenoid O is de-energized allowing the valve 180 to be restored to the Fig. 19 condition thereby again bringing clutch J into engagement under control of the dashpot N which insures smooth engagement of the clutch. The car is now running in a direct drive through the underdrive mechanism C as well as transmission D and, as aforesaid, this drive is preferably a relatively fast drive by reason of the ratio of the differential of the mechanism E at the rear axle of the vehicle. In other words, the car will be driving in a ratio approximating that which is ordinarily termed an overdrive although the drive through the power transmission is obtained with the gears of mechanism C locked up and without taking the drive through gears of the transmission D. This has the advantage of quiet running, less wear on the gears during normal driving conditions, and many other advantages.

A still further speed ratio is readily obtainable with our power transmission and is of considerable importance especially where a fluid coupling B is employed, this speed ratio drive being obtained by a combination of the underdrive of mechanism C and the direct drive in transmission D. For example, in initially starting the vehicle the driver may depress pedal 129 and manipulate selector element 311 from neutral to the direct station 311'' and the car will then be initially accelerated in this speed ratio and as soon as the car reaches the desired predetermined speed the clutch J will automatically be engaged, as aforesaid, to produce automatic step-up to the direct drive from the driving shaft 64 to the tail shaft 391.

In driving the vehicle in reverse, from a condition of car standstill, the driver depresses pedal 129 to release brake G and then manipulates selector element 311 from neutral to the reverse station 311''' thereby bringing the reverse idler gear 389 into mesh with gears 413 and 414 so that the tail shaft 391 will drive reversely relative to shaft 70. The drive will then take place through the underdrive of mechanism C and the reduction reverse drive compounding therewith at the transmission D. If the arrangement is such that engagement of clutch J is set for a sufficiently low speed of vehicle drive, then, of course, the direct clutch J will automatically be engaged to step-up the reverse drive of the car although ordinarily a vehicle is not driven sufficiently fast in reverse to warrant any step-up in a relatively slow speed reverse drive.

Whenever the car is being driven with the clutch J engaged, with transmission D being manipulated for either the low speed or the direct speed, the kick-down mechanism operable by overtravel depression of accelerator pedal 248 is always available (still assuming that a dash knob 198 is in the position illustrated in Fig. 1) so that the mechanism C may be manipulated for the underdrive as in passing another vehicle on the road or under other conditions and more particularly when the car is driven in the city this kick-down control affords a very desirable flexibility of control making it possible from a practical standpoint to arrange the clutch J for normal engagement at a relatively low car speed, say twenty miles per hour by way of example, when the mechanism C and the transmission D are transmitting direct drive. This underdrive mechanism is brought into action by depressing the accelerator pedal beyond its wide open throttle position, thereby closing switch 269 and energizing solenoid O to release the direct clutch, the arrangement preferably being such that the switch 269 remains closed until the accelerator pedal is substantially fully released at which time switch 269 is opened to de-energize the solenoid and effect re-engagement of clutch J under control of the dashpot N.

Whenever it is desired to drive in sustained underdrive through the mechanism C, thereby rendering the direct drive clutch J inoperative, the driver pushes the dash knob 198 forwardly to operate the Bowden wire mechanism 197 for holding the valve 180 in the downward position independently of energization of solenoid O. With the direct drive locked out, the car may be initially accelerated as before by depressing pedal 129 and manipulating transmission D for either of the desired forward speed ratio drives or for the reverse drive. For speed ratio changes after the car is normally running, the selector element 311 may be manipulated without depressing the pedal 129 on account of the overrunning device F, and the attendant energization of solenoid O during shift of the selector element is, of course, without function because the valve 180 is being held downwardly and the solenoid armature 222 is likewise being held outwardly by reason of the dash control 198 under the assumed conditions.

The arrangement of parts in mechanism C is very beneficial from the standpoint of the frictional controlling means G and J for the sun gear 80 affording these friction devices to be made of very small diameter and this is of particular significance in connection with the braking means G because of the beneficial torque distribution through the planetary gear set wherein, during underdrive, the torque is distributed partly to the sun gear and partly to the carrier. Inasmuch as we have provided means for releasing the drive through the mechanism C as well as through transmission D, it will be obvious that if desired the engine may be directly coupled with the driving shaft 64 without the interposition of a fluid coupling or other form of clutch and furthermore, if desired, the fluid coupling may be replaced with a conventional plate type friction clutch although the illustrated arrangement of parts affords an improved degree of desirable car performance and other beneficial characteristics as hereinbefore stated in association with the employment of a fluid coupling.

The pump L is arranged to distribute the oil not only for the operation of the motor K but also to distribute the oil for lubricating purposes by the system of passages and controls best illustrated in Figs. 9, 17 and 19, for supplying the oil to the bore 169 in the shaft 70 for lubricating the various parts of mechanism C. The oil is also supplied rearwardly from the bore 169, the latter having a distributing nipple 417 for this purpose. The rear end of this nipple is directed into the bore 418 of tail shaft 391 from whence the oil is supplied by one or more passages as at 419 for flow along the tail shaft into the various gears of the synchromesh mechanism associated with the shiftable clutch element 385. The nipple 417 is also provided with an outlet 420 so that a portion of the oil will work outwardly and rearwardly to the bearing 405 and also rearwardly thereof to the synchromesh mechanism. In Fig. 11 we have illustrated the customary speedometer drive gears 421 and 422.

Referring to Fig. 22 we have illustrated a slightly modified arrangement for energizing solenoid O in response to operation of pedal 129 whereby the switch is incorporated as a part of the master cylinder and the switch operating mechanism which is illustrated in Fig. 1 may be omitted.

In Fig. 22 the same master cylinder 122 is now provided with a switch 423 having a contact 424 carried by diaphragm 425, this diaphragm being insulated from the casing of the switch and being grounded by the wire 426. The contact 424 is adapted to engage the contact 427 which is connected by a wire 428 with solenoid O when the piston 126 is operated forwardly to place the oil in the cylinder 125 under operating pressure. Thus, the cylinder 125 is open at 429 with a chamber 430 so that the oil pressure will act on the diaphragm and close the switch to energize the solenoid in response to operation of pedal 129. The function of switch 423 in conjunction with the power transmission is identical with the functioning of the corresponding switch 223 in the Fig. 1 embodiment and need not therefore be further described.

Referring now to the embodiment of our invention illustrated in Figs. 23–29, we have provided a power transmission system which, for the most part, is similar in structure and operation to that aforesaid, differing primarily in that the solenoid O has been omitted and in the place thereof we have provided what may be termed a mechanically operating system in contrast with the aforesaid electrically operating system for effecting release of the direct clutch J which, nevertheless, is arranged for independent driver control by accelerator pedal kick-down, dash lock-out of the underdrive, and control by the pedal in conjunction with the release of the braking means G. The general system of gearing in mechanism E and in transmission D may be identical with the principal embodiment of our invention and therefore we have not repeated a detailed showing of such parts, it being understood that the subject modified arrangement of controls are intended for use in conjunction with the foregoing power transmission. In the following description of this modified arrangement we have employed similar reference characters to denote parts corresponding in structure and function with those aforesaid, making it unnecessary to further describe the structure and operation of such corresponding parts.

In Fig. 23 we have illustrated the same selector element 311 operable through the aforesaid Bowden wire mechanism 339 and the aforesaid system of linkages for selectively manipulating the speed for transmission D, although in the present instance the aforesaid switch 339 and the operating means therefor including the segment 321 is now omitted inasmuch as the subject modification does not include the aforesaid solenoid O.

The accelerator pedal 248 is, as before, adapted for movement through a thottle opening range until the throttle valve 245 is fully open and thereafter the accelerator pedal has a further range of movement serving as a kick-down for the underdrive mechanism C. In the present instance we have employed a slightly different system of linkage mechanism in lieu of the aforesaid switch 269 although the controlling functions of the accelerator pedal are the same as in connection with the Fig. 1 embodiment.

In Fig. 23 the accelerator pedal is connected through a link 440 for pivotal connection at 441 to the lower end of a lever 442 which is mounted for rocking support on a transversely extending shaft 443 supported beneath the toe-board 250. A forwardly extending link 444 transmits the throttle controlling movement from the pivotal point 441 to the throttle operating lever 246 through an overtravelling or lost motion mechanism identical with that illustrated in Fig. 8.

Loosely supported on the shaft 443 is a bellcrank lever having a forwardly extending lever portion 445 and a downwardly extending segmental lever portion 446 formed with an arcuate slot 447 within which is slidable a pin 448 carried by the lever 442. When the accelerator pedal is fully released, as in Fig. 23, the pin 448 engages the rear end of slot 447 and this slot is of such length that when the accelerator pedal is moved to the wide open throttle position, then the pin 448 is engaged with the forward end of this slot, the segment 446 and lever 445 connected therewith having remained stationary during the throttle opening movement of the accelerator pedal. However, when the accelerator pedal is further depressed during the kick-down overtravel range during which the Fig. 8 mechanism comes into action for lost motion operation between link 444 and lever 246, then the pin 448 swings the segment 446 in a clockwise direction as viewed in Fig. 23 to produce a corresponding swinging movement of lever 445 to exert a pull on the Bowden wire mechanism operably connected to the forward end of lever 445. The opposite end of the Bowden mechanism is directed to a downwardly extending lever 450 to likewise swing this lever in a clockwise direction.

The pedal 451 corresponds in function with the aforesaid pedal 129 and the subject embodiment is mounted for pivotal support at 452 and is adapted to thrust a link 450 forwardly to swing a lever 453 in a counterclockwise direction, this lever being pivotally supported at 454. The lever 453 actuates a piston rod 455 for operating the aforesaid master cylinder 122 for supplying pressure fluid through the delivery pipe 121, just as in Fig. 1.

Lever 453, when operated by pedal 451, is also adapted to forwardly pull a link 456 for swinging a lever 457 in a clockwise direction.

In Fig. 23 the dash control which corresponds in function to that provided at 198 in Fig. 1 now comprises a driver operable knob 458 operably connected through Bowden wire mechanism 459 with a lever 460. The knob 458 is normally pushed forwardly in order to permit the normal function of underdrive mechanism C to take place and by pulling the knob rearwardly the direct drive clutch J will be rendered inoperative, thereby enabling the motor vehicle to be driven in sustained underdrive through the mechanism C. In the subject embodiment we have provided valving means for controlling the supply of pressure fluid to the aforesaid motor K for operating the clutch J and in this instance operation of any of the aforesaid levers 450, 457 or 460 will so operate the valving means as to cut off the supply of pressure fluid to the motor K and also relieve the latter so that the clutch J will disengage.

Figure 29:
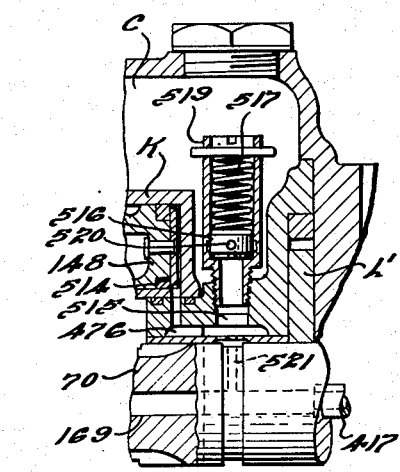
Fig. 29 is a detail sectional plan view taken as indicated by the line 29—29 of Fig. 24.

The pump L' is now arranged to provide an arcuate crescent-shaped intake port 461 and a correspondingly-shaped pressure delivery port 462 which delivers pressure fluid through the passages 463, and 464 (Figs. 24 and 26) for delivering the pressure fluid to the annular port 465 of a sleeve 466 fixed within the vertical bore 467 of the casting 468 which generally corresponds to the aforesaid casting 161, although in this instance the valving means is arranged on the opposite side of the driven shaft from that illustrated in Fig. 19. Slidably disposed within the sleeve 466 is the piston 469 having a reduced portion 470 to provide an annular fluid conducting passage 471 so that with the valve disposed as in Fig. 24, the pressure fluid is supplied from the annular sleeve passage 465 inwardly through the sleeve ports 472, thence downwardly in the passage 471 then outwardly through ports 473 and the annular sleeve passage 474 from which the oil travels inwardly through the delivery passage 475 to an annular casting passage 476 (Fig. 29).

In order to cut off the supply of pressure fluid through passage 475 which leads to the motor K and in order to vent the latter passage, the valve 469 is adapted to have a second position downwardly in sleeve 466 at which time the sleeve ports 472 will be cut off and the piston passage 471, while still remaining in communication with sleeve ports 473, will now also communicate with the vent ports 477 whereby the oil from the motor K will drain back through passage 475, through the valve and vent ports 477 and return to the reservoir at the bottom of the underdrive mechanism. The valve 469 has an axial bore extending therethrough, the upper portion 478 of which is of larger diameter than the lower portion 479 and fixed within the upper end of bore 478 there is provided a closure abutment plug 480 having an enlarged head 481 overlying the top of the valve and at all times moving therewith. The sleeve 466 has an open upper end portion within which is fixed a cylindrical plug 482 having a substantially T-shaped upper end portion overlying the upper end of the sleeve where the plug 482 is provided with the laterally extending ears 483, 484 pivoted at 485 with a swinging detent member 486, each of which carries a roller 487 operating through a slot 488 in the sleeve, the rollers 487 being adapted for selective positioning engagement with a pair of vertically spaced grooves 489 and 490 formed in the valve 469.

In Fig. 24 the rollers 487 are shown in engagement with the valve groove 489 and when the valve is in its clutch releasing position the rollers 487 will engage the other groove 490. The levers 486 have their upper ends yieldingly urged apart by a spring 491 which extends through an opening 492 in the upper end of the T-shaped portion of the plug 482 whereby the rollers 487 will be urged inwardly toward each other for detent controlling operation in association with the aforesaid piston grooves. The sleeve 466 is formed with a vertically extending slot 493 of sufficient proportions to receive the rearwardly extending end portion 494 of a lever 495 and to accommodate downward swinging movement of the lever portion 494 as will presently be apparent. The plug 482 is also provided with a slot 496 registered with slot 493, the lever portion 494 being disposed for engagement with the upper face of the head 481 of the valve plug 480 while the upper face of lever end portion 494 is engaged with the surface 497 of an opening in plug 482 formed by the slot 496 whereby upward movement of lever 495 is prevented by reason of the lever head portion 494 acting against the plug 482 fixed with the stationary sleeve 466.

The lever 495 has its forward end fixed to the inner end of a shaft 498 rotatively journalled in the cover 499 secured by fasteners 500 to the side of the underdrive casing, the shaft 498 extending outwardly to loosely receive the aforesaid levers 460 and 457. Fixed to the shaft 498 is an operating element 501 formed with a pair of faces 502 and 503, respectively engaged, with the parts positioned as illustrated, with the inwardly deflected fingers or tongues 504 and 505 carried respectively as extensions of levers 457 and 460. A rat trap spring 506 has one end fixed to the cover 499 while the other end is engaged with lever 495 for yieldingly urging the lever end portion 494 upwardly against the fixed abutment 482.

The arrangement is such that the levers 457 and 460 will selectively operate through the element 501 to rock the shaft 498 against the action of spring 506 to displace the valve 496 downwardly to the venting position, either of these levers operating independently of the other. Thus, when the pedal operated lever 457 is swung in the aforesaid clockwise direction, its finger 504 thrusts against the face 502 of element 501 to rotate this element in a clockwise direction (Fig. 28) the face 503 leaving the tongue 505 which remains stationary, thereby operating to move the valve 469 downwardly. On the other hand, if the pedal lever 457 remains in the illustrated position, the dash control lever 460, when swung clockwise, will cause its tongue 505 to thrust against the face 503 to correspondingly rotate element 501, the face 502 in this instance moving away from the fixed tongue 504 of the pedal lever 457. When the levers 457 and 460 are restored to the illustrated positions, then the rat trap spring 506 will operate to also restore the shaft 498.

Disposed within the aforesaid bore 479 at the lower end portion of valve 469 there is located a rod 507 formed at its upper end with a head 508 seated on the shoulder formed by the juncture of bores 478 and 479 whereby the valve is free to move downwardly with the rod 507 remaining stationary. Downward movement of rod 507, however, will cause the rod head 508 to pull the valve 469 downwardly from the illustrated position to the venting position thereof, this rod 507 being operably connected with the kick-down operating lever 460 aforesaid. This lever is fixed to an inwardly extending rock shaft 509 (Fig. 25) and fixed to the inner end of the rock shaft there is a swinging yoked lever 510 swivelled by a pin 511 to a block 512 fixed to the lower end of rod 507. Intermediate the block 512 and the bottom of the valve 469 there is located a spring 513 which is sufficiently strong to restore valve 469 to its illustrated position after this valve has been moved downwardly to the venting position by operation of either of the levers 457 or 460 or by the kick-down mechanism.

The spring 513 is of less force than the accelerator pedal return spring 251 so that there is no tendency of this spring to open the throttle valve 245 especially when the valve 469 is moved downwardly by lever 457 or lever 460 and when such operation takes place the segment 446 will be moved counter-clockwise and pin 448 will swing this segment clockwise earlier than with the parts arranged as in Fig. 24 in response to operation of the accelerator pedal 248 but the valve 469 will remain in the lower position under control of lever 457 or 460 even though the accelerator pedal is fully depressed for kick-down because when the accelerator pedal is so operated the head 508 of rod 507 has a maximum limit of travel downwardly corresponding to the position of valve 469 when valve groove 490 is engaged by detent rollers 487. In other words the kick-down of accelerator pedal will have no effect on valve 469 when the latter has already been moved to the downward vented position by levers 457 or 460 although with these levers in the positions illustrated, a kick-down operation of the accelerator pedal will cause the rod 507 to move downwardly and carry valve 469 to the venting position, the lever end 494 remaining as illustrated and the valve plug 480 moving downwardly with the valve away from this lever portion.

After the accelerator pedal has operated valve 469 for the kick-down operation, the detent rollers 487 will hold the valve 469 in the vented position until the pin 448 reaches the rearward end of slot 447 near the end of the releasing movement of the accelerator pedal. As the accelerator pedal moves through the last portion of its release, the segment 446 is restored to the Fig. 23 position, thereby pushing through the Bowden wire mechanism 449 to move block 512 and rod 507 upwardly whereupon the spring 513 will build up sufficient force to cause valve 469 to move upwardly to the Fig. 24 position and restore the engagement of the direct clutch J.

The pressure fluid delivered to the aforesaid passage 476 is taken forwardly and then radially outwardly through delivery passages 514 which correspond to the aforesaid passages 175 for supplying oil in the same manner as aforesaid to the motor K. The passage 476 is also open through a passage 515 for fluid operation on a release valve 516 normally seated by the preloaded spring 517 and adapted for outward movement when the pressure of the fluid builds up to the desired predetermined point to relieve the excess pressure through the escape ports 518 formed in the housing 519 of the relief valve. The valve 516 is provided with the metering passage 520 corresponding in structure and function with the aforesaid metering passage 287 in Fig. 19. In the operation of the power transmission illustrated in Figs. 23–29, the drives take place through the underdrive mechanism C and the change speed mechanism D just as hereinbefore stated with the exception that in the subject embodiment the direct clutch J does not have automatic release in response to manipulation of the selector element 311 making it desirable for the operator to depress the pedal 451 when selectively manipulating the transmission D. Depressing the pedal 451, as before, causes the master cylinder 122 to supply pressure fluid to release the brake G and also effects release of the clutch J, in this instance by operating lever 457 of the clutch J, to move valve 469 downwardly to vent the motor K.

When the driver desires to provide the sustained underdrive in mechanism C, he pulls the knob 458 to operate lever 460 thereby moving the valve 469 downwardly to the venting position independently of operation of lever 457 and also independently of the kick-down control on the valve.

When the accelerator pedal is operated for the kickdown, the valve 469 is likewise moved downwardly to the venting position independently of manipulation of the pedal 451 or the dash control at 458.

The automatic engagement of clutch J will take place in response to predetermined speed of the driven shaft 70 just as in the foregoing embodiment, the build-up of the pressure delivery at the pump L' functioning as before preferably under control of the metering passage 520 and by the pressure relief spring 517. In the present instance the lubricant distributing shaft bore 169 communicates with the pressure fluid passage 476 by a somewhat restricted passage 521 so proportioned that pressure fluid will be built up by the pump L' to operate the clutch J while at the same time affording a constant supply of oil to the bore 169 for lubricating purposes, as in the preceding embodiment.

Referring to Figs. 30–32, we have illustrated the valving means and control mechanism generally similar to that illustrated in Figs. 23–29 but differing therefrom primarily by incorporating a single operating lever for moving the valve downwardly to the venting position in lieu of the levers 495 and 510 employed in the preceding embodiment. Thus we have provided a single lever 522 fixed to a transverse shaft 523 for operation by the lever 524 at the outside of the transmission casing, this lever having swivel connection between pins 525, 526 and 527 respectively with the swivel blocks 528, 529 and 530. Each of these blocks has a bore extending generally transversely of lever 524 so that the aforesaid blocks in the order named respectively slidably receive rods 531, 532 and 533, the latter carrying operating abutments 534, 535 and 536 engaging the rear faces of the associated blocks so that any of the rods may be pulled and cause the associated abutment to move lever 524 through the associated block while the remaining two rods and their associated abutments remain fixed although the respective blocks associated with the latter have a swivelling movement thereby accommodating the swinging of the lever 524. The aforesaid rods are preferably also arranged at their forward connecting ends (not shown) for slight pivotal movement so as to further accommodate the swinging movement of lever 524 or these rods may be operating parts of Bowden wire mechanisms as in the case of rod 531 and rod 533 which are adapted for operation by the Bowden wire mechanisms 537 and 538, respectively.

The Bowden wire mechanism 537 is adapted to extend to the dash operated knob 458 of Fig. 23 so that when the knob is pulled the abutment 534 will swing lever 524 clockwise independently of rods 532 and 533 thereby to swing the single valve operating lever 522 in a clockwise direction, as viewed in the drawings.

The rod 532 is adapted for operative connection with the aforesaid pedal 451 so that when the pedal is depressed the abutment 535 will likewise swing the lever 522 independently of the other rods 531 and 533.

The rod 533 may also be formed as a Bowden wire operator 538 as aforesaid which takes the place of the corresponding Bowden wire 449 in the preceding embodiment. A fixed abutment 539 slidably receives rod 533, a spring 540 being disposed between this abutment and the block 530 for yieldingly restoring the lever 522 and the valve connected therewith.

The single valve operating lever 522 has an outer end portion 540 located within an opening 541 of the valve 542, a stop pin 543 limiting the upward movement of the valve under the action of spring 540. The pressure fluid delivered from passage 464 is admitted to an annular passage 544 of a sleeve 545 fixed within the casting bore 546, the sleeve having ports 547 communicating with passage 544 for admitting the passage fluid to the annular valve chamber 548 so that with the valve positioned as illustrated the pressure fluid is conducted from supply passage 464 to the valve passage 548 and thence outwardly through ports 549 to the annular sleeve passage 550 which is in communication with the delivery passage 551 corresponding to the aforesaid passage 475 for supplying pressure fluid to operate the clutch J and for lubricating purposes just as in the preceding embodiment. The sleeve 545 is also formed with the ports 552 and the annular passage 553 open at the bottom so as to vent passage 551 when the valve 542 is moved downwardly. Thus in the downward position of the valve the valve passage 548 closes off the ports 547 and opens the ports 549 to the vent ports 552 for controlling functions similar to the corresponding parts in the preceding embodiment.

The valve 542 has a detent control operably associated therewith and in this embodiment this detent control is associated with the lower end of the valve where the latter has the grooves 554 and 555 selectively engaged by the rollers 556 carried by the swinging levers 557 pivoted at 558 and yieldingly urged for detent operation by spring 559 expanding between the lower ends of the levers 557.

With the parts arranged as illustrated either of the control rods 531, 532 or 533 may be independently operated for adjusting valve 542 downwardly to its venting position to effect release of clutch J, spring 540 operating to restore valve 542 to the illustrated position when such operated control rod is released. The operating functions of the mechanisms in association with the power transmission are identical to those aforesaid and need not be further repeated.

Referring now to Figs. 33 and 34, we have illustrated a modified form of driving connection between the engine and the in-put annulus gear in lieu of providing a fluid coupling to transmit this drive, the power transmission being otherwise identical with that described in any of the preceding embodiments. In this modification we have, in effect, terminated driven shaft 70 and annulus gear hub 71 of the Fig. 9 arrangement approximately at the forward end of the carrier hub 78 while the engine crankshaft 53 has its rear end terminating closely adjacent the forward end of the driven shaft. This crankshaft now has the fasteners 54 mounting the flywheel 560, the latter being provided with the starter ring gear 561.

The rear face of the flywheel is provided at a plurality of circumferentially spaced points with a cavity 562 and secured to the rear of the flywheel by fasteners 563 there is a plate 564 and opposite the cavities 562 this plate is formed with companion cavities 565. Within the pairs of companion cavities there is disposed a coil spring 566 thrusting against the end walls of the cavities in a circumferential direction, each spring also thrusting against corresponding end walls of an opening 567 formed in a driven disc 568 which extends radially outwardly from a hub portion 569 so as to lie between the plate 564 and the flywheel 560. Located at points disposed circumferentially between the aforesaid pairs of cavities 562 and 565, the flywheel is formed with rearwardly opening spring receiving recesses 570, each receiving a coil spring 571 thrusting the driven disc 568 rearwardly into frictional engagement with the forward face of plate 564 which, at the location of these springs, is formed in a plane perpendicular to the axis of rotation of a crankshaft.

The hub 569 of the driven disc 568 is welded to an internally splined sleeve 572 having the splines thereof engaging corresponding splines 573 formed on the hollow hub portion 574 of the aforesaid annulus gear 72. The driven shaft 575 is splined to hollow hub portion 78 of the carrier 77 just as in connection with the driven shaft 70 in Fig. 9.

The crankshaft 53 transmits its forwardly driving rotation through the flywheel 560 and thence through springs 566 to the driven disc 568 which has direct drive connection with the input annulus gear 72. The arrangement is such that the springs 566 provide a cushioning in the drive from the engine to the power transmission serving to dampen vibrations tending to be transmitted from the engine to the power transmission and vice versa; also serving to cushion the operation of the over-running control device F, clutch J, and the operating parts of the change speed transmission D. Torsional impulses relatively between the engine and power transmission are dampened by the frictional slip afforded between driven disc 568 and plate 564 under the load of springs 571 so that in many instances vibrations and noises are minimized, thereby obtaining through this mechanical driving means many of the advantages obtained by the use of the fluid coupling B in the preceding embodiments.

In order to avoid repetition, we have shown only a portion of the Fig. 9 mechanism operably connected with the engine crankshaft 53 although it will be understood that the structure and operation of the power transmission as a whole is identical with that previously described in the several embodiments with the exception, of course, that in the present modification a cushion drive of a mechanical nature is employed in lieu of the fluid coupling.

We do not limit our invention, in the broader aspects thereof, to any particular combination and arrangement of parts such as shown and described for illustrative purposes since various modifications will be apparent from the teachings of our invention and scope thereof as defined in the appended claims.

What we claim is:

1. In a planetary gear transmission for a motor vehicle having an engine, a driving shaft adapted to be driven by the engine, a driven shaft adapted to drive the vehicle, an annulus gear directly driven from the driving shaft, a planet pinion meshing with said annulus gear, an axle mounting said planet pinion, a carrier for said axle directly inwardly from said axle for direct drive connection with the driven shaft, a sun gear meshing with said planet pinion, overrunning control means automatically operating to prevent rotation of said sun gear in the direction of rotational tendency thereof caused by drive of said internal gear to provide a reduction drive from the driving shaft to the driven shaft, pressure fluid controlled clutch means operable to effect direct drive connection of said sun gear with said driven shaft to provide a direct drive from the driving shaft to the driven shaft, and means automatically acting in response to drive of the vehicle at a predetermined speed for controlling delivery of pressure fluid to said clutch means.

2. In a planetary gear transmission for a motor vehicle having an engine, said engine having a crankshaft mounting a fluid impeller, a fluid runner having a central hub, a bearing journalling said hub on the crankshaft, a driving shaft having a hollow forward end portion projecting concentrically within said bearing, said end portion being positioned within and splined to said runner hub, said driving shaft having a hollow enlarged rear end portion, a driven shaft adapted to drive the vehicle and having a forward portion disposed to lie within said runner hub and hollow driving shaft forward portion and journalled by the latter adjacent said bearing, an annulus gear carried by said hollow driving shaft portion, a planet gear meshing with said annulus gear, a carrier for said planet gear, said carrier having a tubular shaft portion extending within said hollow driving shaft portion and surrounding said driven shaft portion for direct drive connection therewith, a sun gear meshing with said planet gear, and means controlling rotation of said sun gear.

3. In a planetary gear transmission for a motor vehicle having an engine, a driving shaft adapted to be driven by the engine, a driven shaft adapted to drive the vehicle, an annulus gear directly driven from the driving shaft, a planet pinion meshing with said annulus gear, an axle mounting said planet pinion, a carrier for said axle extending directly inwardly from said axle for direct drive connection with the driven shaft, a sun gear surrounding the driven shaft and meshing with said planet pinion, said sun gear having a rearwardly extending control portion, a rotatable drive-control element surrounding said sun gear portion, overrunning means between said drive-control element and said sun gear portion for preventing rotation of said sun gear in one direction, said overrunning means operating to permit rotation of said sun gear in the direction opposite to that aforesaid, an annular brake disk member anchored to said drive-control element, a non-rotating brake disk member adapted for frictional engagement with said annular brake disk member, a spring establishing frictional engagement of said brake disk members for holding said drive-control element against rotation, a pressure fluid operated motor for unloading said spring to disengage said brake disk members, and driver operated fluid pumping means for operating said motor.

4. In a planetary gear transmission for a motor vehicle having an engine, a driving shaft adapted to be driven by the engine, a driven shaft adapted to drive the vehicle, an annulus gear directly driven from the driving shaft, a planet pinion meshing with said annulus gear, an axle mounting said planet pinion, a carrier for said axle extending directly inwardly from said axle for direct drive connection with the driven shaft, a sun gear surrounding the driven shaft and meshing with said planet pinion, said sun gear having a rearwardly extending control portion, a rotatable drive-control element surrounding said sun gear portion, overrunning means between said drive-control element and said sun gear portion for preventing rotation of said sun gear in one direction, said overrunning means operating to permit rotation of said sun gear in the direction opposite to that aforesaid, a clutch disk member drivingly connected with said sun gear portion, a second clutch disk member drivingly connected with the driven shaft and adapted for frictional engagement with the first said clutch disk member, a pressure fluid operated motor for effecting frictional engagement of said clutch disk members, means responsive to rotation of the driven shaft at a predetermined speed for controlling delivery of pressure fluid to said motor thereby establishing frictional engagement of said clutch disk members, and yielding means opposing said engagement means to effect disengagement of said clutch disk members when said driven shaft is at rest.

5. In a power transmission for a motor vehicle having an engine provided with a crankshaft, a fluid coupling including driving and driven coupling structures respectively adapted to receive and to transmit power from the engine, said driven coupling structure having a central hub, a bearing journalling said hub in the crankshaft, a hollow transmission driving shaft mounting the hub of said driven coupling structure and extending within said bearing, a driven shaft having an end portion projecting within the hub of said driven coupling structure and journalled within said hollow driving shaft, and change speed transmission mechanism operable between the driving and driven shafts.

6. In a power transmission for a motor vehicle having an engine, means driven by the engine including a hollow journalling part, a hollow transmission driving shaft having a forward end portion projecting axially within said hollow journalling part, a fluid coupling including a driving coupling structure fixed with said engine driven means and a driven coupling structure having a hub fixed on the forward end portion of said hollow driving shaft, an anti-friction bearing between said hub and said hollow journalling part, a transmission driven shaft having a forward end portion journalled within the forward end portion of said hollow driving shaft, and change speed transmission mechanism operably connecting the driving and driven shafts.

7. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable from a first control condition of accommodating the aforesaid automatic operation of said overrunning means to a second control condition of rendering said overrunning means ineffective to prevent rotation of said remainder member as aforesaid so as to release said lesser speed drive, valving means operable to control supply of pressure fluid to said clutch means; a vehicle driver actuated control element; means operating in response to actuation of said control element by the vehicle driver for effecting operation of said valving means and operation of said control means from its said first control condition to its said second control condition thereby releasing the driven shaft from drive by the driving shaft; and means operable to effect operation of said valving means with said control means remaining in its said first control condition.

8. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable by pressure fluid to render said overrunning means ineffective to prevent rotation of said remainder member as aforesaid so as to release said lesser speed drive; means including a driver operated pump for delivering pressure fluid to said control means; a pedal adapted for actuation by the vehicle driver; and means operating in response to actuation of said pedal by the vehicle driver for effecting release of said clutch means and for operating said pump thereby releasing the driven shaft from drive by the driving shaft.

9. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable by pressure fluid to render said overrunning means ineffective to prevent rotation of said remainder member as aforesaid so as to release said lesser speed drive; means including a driver operated pump for delivering pressure fluid to said control means; valving means operable to control supply of pressure fluid to said clutch means; a pedal adapted for actuation by the vehicle driver; and means operating in response to actuation of said pedal by the vehicle driver for effecting operation of said valving means and for operating said pump thereby releasing the driven shaft from drive by the driving shaft.

10. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable to render said overrunning means ineffective to prevent rotation of said remainder member as aforesaid so as to release said lesser speed drive; a vehicle driver actuated control element; means operating in response to actuation of said control element by the vehicle driver for effecting release of said clutch means and operation of said control means thereby releasing the driven shaft from drive by the driving shaft; and means operable by the vehicle driver for effecting release of said clutch means independently of driver actuation of said control element thereby rendering said direct drive inoperable.

11. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable to render said overrunning means ineffective to prevent rotation of said remainder member as aforesaid so as to release said lesser speed drive; valving means operable to control supply of pressure fluid to said clutch means; a vehicle driver actuated control element; means operating in response to actuation of said control element by the vehicle driver for effecting operation of said valving means and operation of said control means thereby releasing the driven shaft from drive by the driving shaft; and means operable by the vehicle driver for effecting operation of said valving means independently of driver actuation of said control element to release said clutch means thereby rendering said direct drive inoperative.

12. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable by pressure fluid to render said overrunning means ineffective to prevent rotation of said remainder member as aforesaid so as to release said lesser speed drive; means including a driver operated pump for delivering pressure fluid to said control means; valving means operable to control supply of pressure fluid to said clutch means; a pedal adapted for actuation by the vehicle driver; means operating in response to actuation of said pedal by the vehicle driver for effecting operation of said valving means and for operating said pump thereby releasing the driven shaft from drive by the driving shaft; and means operable by the vehicle driver for effecting operation of said valving means independently of driver actuation of said pedal to release said clutch means thereby rendering said direct drive inoperative.

13. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; driver operated means for adjusting the engine throttle valve; means operable in response to driver operation of said throttle valve adjusting means for effecting release of said clutch means thereby releasing said direct drive and causing said lesser speed drive to take place; control means for said overrunning means operable from a first control condition of accommodating the aforesaid automatic operation of said overrunning means to a second control condition of rendering said overrunning means ineffective to prevent rotation of said remainder member as aforesaid so as to release said lesser speed drive; a vehicle driver actuated control element; means operating in response to actuation of said control element by the vehicle driver for effecting release of said clutch means from its said first control condition to its said second control condition and operation of said control means thereby releasing the driven shaft from drive by the driving shaft; and means operable to effect operation and release of said clutch means with said control means remaining in its said first control condition.

14. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; driver operated means for adjusting the engine throttle valve; means operable in response to driver operation of said throttle valve adjusting means for effecting release of said clutch means thereby releasing said direct drive and causing said lesser speed drive to take place; control means for said overrunning means operable to render said overrunning means ineffective to prevent rotation of said remainder member as aforesaid so as to release said lesser speed drive; a vehicle driver actuated control element; means operating in response to actuation of said control element by the vehicle driver for effecting release of said clutch means and operation of said control means thereby releasing the driven shaft from drive by the driving shaft; and means operable by the vehicle driver for effecting release of said clutch means independently of driver actuation of said control element and independently of driver operation of said throttle valve adjusting means thereby rendering said direct drive inoperable while enabling sustained operation of said lesser speed drive.

15. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; driver operated means for adjusting the engine throttle valve; means operable in response to driver operation of said throttle valve adjusting means for effecting operation of said valving means to release said clutch means thereby releasing said direct drive and causing said lesser speed drive to take place; control means for said overrunning means operable to render said overrunning means ineffective to prevent rotation of said remainder member as aforesaid so as to release said lesser speed drive; a vehicle driver actuated control element; means operating in response to actuation of said control element by the vehicle driver for effecting operation of said valving means and operation of said control means thereby releasing the driven shaft from drive by the driving shaft; and means operable by the vehicle driver for effecting operation of said valving means to release said clutch means independently of driver actuation of said control element and independently of said throttle valve adjusting means thereby rendering said direct drive inoperable and enabling sustained operation of said lesser speed drive.

16. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; means automatically acting in response to accelerating the vehicle from rest in said lesser speed drive for operating said clutch means; control means for said overrunning means operable to render said overrunning means ineffective to prevent rotation of said remainder member as aforesaid so as to release said lesser speed drive; a vehicle driver actuated control element; and means operating in response to actuation of said control element by the vehicle driver for effecting release of said clutch means and operation of said control means thereby releasing the driven shaft from drive by the driving shaft.

17. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable to render said overrunning means ineffective to prevent rotation of said remainder member as aforesaid so as to release said lesser speed drive; valving means operable to control supply of pressure fluid to said clutch means; means under control of said valving means acting in response to accelerating the vehicle from rest in said lesser speed drive for supplying pressure fluid to operate said clutch means; a vehicle driver actuated control element; and means operating in response to actuation of said control element by the vehicle driver for effecting operation of said valving means and operation of said control means thereby releasing the driven shaft from drive by the driving shaft.

18. In a power transmission for a motor vehicle having an engine; a driving shaft adapted to receive drive from the engine; a driven shaft;

means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable to render said overrunning means ineffective to prevent rotation of said remainder member as aforesaid so as to release said lesser speed drive; valving means operable to control supply of pressure fluid to said clutch means; a pressure fluid delivery pump driven with the driven shaft for delivering pressure fluid under control of said valving means to operate said clutch means so as to automatically cause operation of said direct drive in response to accelerating the vehicle from rest in said lesser speed drive; a vehicle driver actuated control element; and means operating in response to actuation of said control element by the vehicle driver for effecting operation of said valving means and operation of said control means thereby releasing the driven shaft from drive by the driving shaft.

19. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to establish direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; means operable under control of a predetermined vehicle driving speed for effecting said drive-establishing operation of said clutch means; and means operable by the vehicle driver for effecting release of said clutch means to render said direct drive inoperative and enable sustained vehicle drive in said lesser speed both below and above said predetermined speed.

20. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; driver operated means for adjusting the engine throttle valve; means operable in response to driver operation of said throttle valve adjusting means for effecting release of said clutch means thereby releasing said direct drive and causing said lesser speed drive to take place; and means operable by the vehicle driver for effecting release of said clutch means independently of driver operation of said throttle valve adjusting means thereby rendering said direct drive inoperable and enabling sustained vehicle drive in said lesser speed.

21. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; driver operated means for adjusting the engine throttle valve; means operable in response to driver operation of said throttle valve adjusting means for effecting operation of said valving means to release said clutch means thereby releasing said direct drive and causing said lesser speed drive to take place; and means operable by the vehicle driver for effecting operation of said valving means to release said clutch means independently of said throttle valve adjusting means thereby rendering said direct drive inoperable and enabling sustained vehicle drive in said lesser speed.

22. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overruuning means operating to automatically release said remainder member to accommodate said direct drive; electrically energized means for controlling operation of said clutch means; a plurality of independently operable control elements adapted for selective actuation by the vehicle driver; and a plurality of means respectively operating in response to driver actuation of said control elements for controlling energization of said electrically energized means to cause release of said clutch means thereby releasing said direct drive.

23. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; electrically energized means for controlling operation of said clutch means; a vehicle driver actuated control element; means operating in response to actuation of said control element by the vehicle driver for controlling energization of said electrically energized means to cause release of said clutch means thereby releasing said direct drive; and means operable by the vehicle driver independently of driver actuation of said control element and independently of said electrically energized means for effecting release of said clutch means to render said direct drive inoperative and enable sustained vehicle drive in said lesser speed.

24. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven saft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; a solenoid adapted to be electrically energized for controlling operation of said valving means; a vehicle driver actuated control element; and means operating in response to actuation of said control element by the vehicle driver for controlling energization of said solenoid to cause release of said clutch means thereby releasing said direct drive.

25. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; a solenoid adapted to be electrically energized for controlling operation of said valving means; a plurality of independently operable control elements adapted for selective actuation by the vehicle driver; and a plurality of means respectively operating in response to driver actuation of said control elements for controlling energization of said solenoid to cause release of said clutch means thereby releasing said direct drive.

26. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; a solenoid adapted to be electrically energized for controlling operation of said valving means; and means operating in response to driver operation of said throttle valve adjusting means for controlling energization of said solenoid to cause release of said clutch means thereby releasing said direct drive and causing said lesser speed drive to take place.

27. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; a solenoid adapted to be electrically energized for controlling operation of said valving means; a vehicle driver actuated control element; means operating in response to actuation of said control element by the vehicle driver for controlling energization of said solenoid to cause release of said clutch means thereby releasing said direct drive; and means operable by the vehicle driver independently of driver actuation of said control element and independently of said solenoid for effecting release of said clutch means to render said direct drive inoperative and enable sustained vehicle drive in said lesser speed.

28. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; control means for said overrunning means operable to render said overrunning means ineffective to prevent rotation of said remainder member as aforesaid so as to release said lesser speed drive; valving means operable to control supply of pressure fluid to said clutch means; a solenoid adapted to be electrically energized for controlling operation of said valving means; a driver actuated control element; and means operating in response to actuation of said control element by the vehicle driver for controlling energization of said solenoid to cause release of said clutch means and for effecting operation of said control means thereby releasing the driven shaft from drive by the driving shaft.

29. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; a tailshaft adapted to be driven by the driven shaft for driving the vehicle; change speed mechanism for selectively driving the tailshaft from the driven shaft in at least one forwardly driving speed ratio or in reverse; a manually shiftable selector element; means for selectively manipulating said change speed mechanism in response to shift of said selector element; and means operating in response to shift of said selector element for effecting release of said clutch means to facilitate said selective manipulation of said change speed mechanism.

30. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of fluid pressure to said clutch means; a tailshaft adapted to be driven by the driven shaft for driving the vehicle; change speed mechanism for selectively driving the tailshaft from the driven shaft in at least one forwardly driving speed ratio or in reverse; a manually shiftable selector element; means for selectively manipulating said change speed mechanism in response to shift of said selector element; and means operating in response to shift of said selector element for effecting operation of said valving means for releasing said clutch means to facilitate said selective manipulation of said change speed mechanism.

31. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; a tailshaft adapted to be driven by the driven shaft for driving the vehicle; change speed mechanism for selectively driving the tailshaft from the driven shaft in at least one forwardly driving speed ratio or in reverse; a manually shiftable selector element; means for selectively manipulating said change speed mechanism in response to shift of said selector element; electrically energized means for controlling operation of said clutch means; and means operating in response to shift of said selector element for controlling energization of said electrically energized means for releasing said clutch means to facilitate said selective manipulation of said change speed mechanism.

32. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; a solenoid adapted to be electrically energized for controlling operation of said valving means; a tailshaft adapted to be driven by the driven shaft for driving the vehicle; change speed mechanism for selectively driving the tailshaft from the driven shaft in at least one forwardly driving speed ratio or in reverse; a manually shiftable selector element; means for selectively manipulating said change speed mechanism in response to shift of said selector element; and means operating in response to shift of said selector element for controlling energization of said solenoid to cause release of said clutch means to facilitate said selective manipulation of said change speed mechanism.

33. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, and means automatically acting in response to accelerating the vehicle from rest for operating said drive control means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a plurality of independently operable control elements adapted for selective actuation by the vehicle driver; and a plurality of means respectively operating in response to driver actuation of said control elements for effecting release of said drive control means thereby changing the drive from said faster speed drive to said slower speed drive.

34. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, and means automatically acting in response to accelerating the vehicle from rest for operating said drive control means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a vehicle driver actuated control element; means operating in response to actuation of said control element by the vehicle driver for effecting release of said drive control means; and means operable by the vehicle driver for effecting release of said control means independently of driver actuation of said control element to render said faster speed drive inoperative and enable sustained vehicle driver in said slower speed drive.

35. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, and means automatically acting in response to accelerating the vehicle from rest for operating said drive control means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a forwardly and reversely rotatable tailshaft; change speed mechanism comprising means selectively operable for driving the tailshaft forwardly in a plurality of relatively different speed ratios or reversely from the driven shaft; vehicle driver manipulated means operating to effect selective operation of said change speed transmission; and means operating in response to driver manipulation of said manipulated means for effecting release of said drive control means to facilitate said selective operation of said change speed mechanism.

36. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, and means automatically acting in response to accelerating the vehicle from rest for operating said drive control means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a forwardly and reversely rotatable tailshaft; change speed mechanism comprising means selectively operable for driving the tailshaft forwardly in a plurality of relatively different speed ratios or reversely from the driven shaft; vehicle driver manipulated means operating to effect selective operation of said change speed transmission; means operating in response to driver manipulation of said manipulated means for effecting release of said drive control means to facilitate said selective operation of said change speed mechanism; a vehicle driver actuated control element; and means operating in response to actuation of said control element by the vehicle driver for effecting release of said drive control means independently of driver manipulation of said manipulated means.

37. In a power transmission for driving a vehicle having an engine; a forwardly rotatable driving shaft; a forwardly rotatable driven shaft; means operable to forwardly drive the driven shaft from the driving shaft including, releasable pressure fluid operated drive control means operable to establish operation of said driving means, valving means controlling delivery of pressure fluid to operate said drive control means, and means automatically acting in response to accelerating the vehicle from rest for delivering pressure fluid to said drive control means under releasable control of said valving means; gearing means including an overrunning device operable independently of said pressure fluid delivering means to forwardly drive the driven shaft from the driving shaft at a slower speed than that provided by the first said driving means thereby to provide acceleration of the vehicle from rest; said device overrunning during operation of said faster speed driving means; a plurality of independently operable control elements adapted for selective actuation by the vehicle driver; and a plurality of means respectively operating in response to actuation of said control elements for effecting selective operation of said valving means to release said pressure fluid operated drive control means thereby changing the drive from said faster speed drive to said slower speed drive.

38. In a power transmission for driving a vehicle having an engine; a forwardly rotatable driving shaft; a forwardly rotatable driven shaft; means operable to forwardly drive the driven shaft from the driving shaft including, releasable pressure fluid operated drive control means operable to establish operation of said driving means, valving means controlling delivery of pressure fluid to operate said drive control means, and means automatically acting in response to accelerating the vehicle from rest for delivering pressure fluid to said drive control means under releasable control of said valving means; gearing means including an overrunning device operable independently of said pressure fluid delivering means to forwardly drive the driven shaft from the driving shaft at a slower speed than that provided by the first said driving means thereby to provide acceleration of the vehicle from rest; said device overrunning during operation of said faster speed driving means; a forwardly and reversely rotatable tailshaft; change speed mechanism comprising means selectively operable for driving the tailshaft forwardly in a plurality of relatively different speed ratios or reversely from the driven shaft; vehicle driver manipulated means operating to effect selective operation of said change speed transmission; and means operating in response to driver manipulation of said manipulated means for effecting operation of said valving means to release said pressure fluid operated drive control means to facilitate said selective operation of said change speed mechanism.

39. In a power transmission for driving a vehicle having an engine; a forwardly rotatable driving shaft; a forwardly rotatable driven shaft; means operable to forwardly drive the driven shaft from the driving shaft including, releasable pressure fluid operated drive control means operable to establish operation of said driving means, valving means controlling delivery of pressure fluid to operate said drive control means, and means automatically acting in response to accelerating the vehicle from rest for delivering pressure fluid to said drive control means under releasable control of said valving means; gearing means including an overrunning device operable independently of said pressure fluid delivering means to forwardly drive the driven shaft from the driving shaft at a slower speed than that provided by the first said driving means thereby to provide acceleration of the vehicle from rest; said device overrunning during operation of said faster speed driving means; a forwardly and reversely rotatable tailshaft; change speed mechanism comprising means selectively operable for driving the tailshaft forwardly in a plurality of relatively different speed ratios or reversely from the driven shaft; vehicle driver manipulated means operating to effect selective operation of said change speed transmission; means operating in response to driver manipulation of said manipulated means for effecting operation of said valving means to release said pressure fluid operated drive control means to facilitate said selective operation of said change speed mechanism; a vehicle driver actuated control element; and means operating in response to actuation of said control element by the vehicle driver for effecting operation of said valving means to release said pressure fluid operated drive control means independently of driver manipulation of said manipulated means.

40. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, means acting automatically in response to accelerating the vehicle from rest for operating said drive control means, and a solenoid for controlling the operation of said drive control means by said automatically acting means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a plurality of independently operable control elements adapted for selective actuation by the vehicle driver; and a plurality of means respectively operating in response to driver actuation of said control elements for controlling energization of said solenoid to release said drive control means thereby changing the drive from said faster speed drive to said slower speed drive.

41. In a power transmission for driving a vehicle having an engine provided with a throttle valve; a forwardly rotatable driving shaft; a forwardly rotatable driven shaft; means operable to forwardly drive the driven shaft from the driving shaft including, releasable drive control means operable to establish operation of said driving means, means acting automatically in response to accelerating the vehicle from rest for operating said drive control means, and a solenoid for controlling the operation of said drive control means by said automatically acting means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; driver operated means for adjusting the engine throttle valve; and means operable in response to driver operation of said throttle valve adjusting means for controlling energization of said solenoid to release said drive control means thereby changing the drive from said faster speed drive to said slower speed drive.

42. In a power transmission for driving a vehicle having an engine provided with a throttle valve; an accelerator pedal operable by the vehicle driver; means operably connecting said accelerator pedal with said throttle valve accommodating movement of said accelerator pedal through a throttle opening range and therebeyond for overtravelling the throttle valve while maintaining the latter in substantially fully opened position; a forwardly rotatable driving shaft; a forwardly rotatable driven shaft; means operable to forwardly drive the driven shaft from the driving shaft including, releasable drive control means operable to establish operation of said driving means, means acting automatically in response to accelerating the vehicle from rest for operating said drive control means, and a solenoid for controlling the operation of said drive control means by said automatically acting means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; and means operable in response to operation of said accelerator pedal for said overtravelling movement for controlling energization of said solenoid to release said drive control means thereby changing the drive from said faster speed drive to said slower speed drive.

43. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, means acting automatically in response to accelerating the vehicle from rest for operating said drive control means, and a solenoid for controlling the operation of said drive control means by said automatically acting means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a vehicle driver actuated control element; means operating in response to actuation of said control element by the vehicle driver for controlling energization of said solenoid to release said drive control means; and means operable by the vehicle driver for effecting release of said control means independently of said solenoid to render said faster speed drive inoperative and enable sustained vehicle drive in said slower speed drive.

44. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, means acting automatically in response to accelerating the vehicle from rest for operating said drive control means, and a solenoid for controlling the operation of said drive control means by said automatically acting means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a forwardly and reversely rotatable tailshaft; change speed mechanism comprising means selectively operable for driving the tailshaft forwardly in a plurality of relatively different speed ratios or reversely from the driving shaft; vehicle driver manipulated means operating to effect selective operation of said change speed transmission; and means operating in response to driver manipulation of said manipulated means for controlling energization of said solenoid to release said drive control means to facilitate said selective operation of said change speed mechanism.

45. In a power transmission for driving a vehicle having an engine; a forwardly rotatable driving shaft; a forwardly rotatable driven shaft; means operable to forwardly drive the driven shaft from the driving shaft including, releasable drive control means operable to establish operation of said driving means, means acting automatically in response to accelerating the vehicle from rest for operating said drive control means, and a solenoid for controlling the operation of said drive control means by said automatically acting means; gearing means including an overrunning device operable independently of said automatically acting means to forwardly drive the driven shaft from the driving shaft at a speed slower than that provided by the first said driving means thereby to provide acceleration of the vehicle from rest; said device overrunning during operation of said faster speed driving means; a forwardly and reversely rotatable tailshaft; change speed mechanism comprising means selectively operable for driving the tailshaft forwardly in a plurality of relatively different speed ratios or reversely from the driving shaft; vehicle driver manipulated means operating to effect selective operation of said change speed transmission; means operating in response to driver manipulation of said manipulated means for controlling energization of said solenoid to release said drive control means to facilitate said selective operation of said change speed mechanism; a driver actuated control element; and means operating in response to actuation of said control element by the vehicle driver for controlling energization of said solenoid to release said drive control means independently of driver manipulation of said manipulated means.

46. In a power transmission for driving a vehicle, a driving shaft, a driven shaft, a tailshaft, planetary gearing means driven from said driving shaft for driving the driven shaft in an underdrive ratio or in direct, selectively operable change speed mechanism driven from said driven shaft for selectively driving the tailshaft in a plurality of forward speeds and in reverse, a driver operated shift element selectively shiftable between a plurality of predetermined stations of speed ratio drive control for manipulating said change speed mechanism, and means operable in response to driver shift of said shift element from one of said stations to another for causing momentary release and then restoration of at least one of said drives of said planetary gearing means.

47. In a power transmission for driving a vehicle, a driving shaft, a driven shaft, a tailshaft, means operable between said driving and driven shafts for driving the driven shaft forwardly from the driving shaft either directly or at a different speed, solenoid controlled means for effecting release of one of said drives, selectively operable change speed mechanism for driving the tailshaft from the driven shaft forwardly in a plurality of relatively different speed ratios or in reverse, a driver manipulated shift element adapted to selectively manipulate said change speed mechanism, and means operable in response to driver manipulation of said shift element for controlling energization of said solenoid during manipulation of said shift element.

48. In a power transmission for driving a vehicle having an engine; a fluid coupling driven by the engine; a driven shaft, a driving shaft driven by the fluid coupling and adapted to drive the driven shaft; means operable between said shafts for driving the driven shaft from the driving shaft in underdrive or direct; said underdrive driving means including, a drive-reaction taking overrunning device adapted to overrun during the direct drive, and control means for selectively rendering said overrunning device operable to provide the underdrive or inoperable to release the underdrive; said direct driving means including second control means operating to control the direct drive; a gear continuously rotated by and with the driven shaft; a tailshaft; selectively operable change speed mechanism driven by said gear and adapted to drive the tailshaft forwardly or in reverse; driver manipulated means for selectively controlling the operation of said change speed mechanism; means operating in response to driver manipulation of said manipulated means for effecting release of said second control means to facilitate selective operation of said change speed mechanism; and means operable by the vehicle driver independently of said drive manipulated means for actuating the first said control means to render said overrunning device inoperable.

49. In a power transmission for driving a vehicle having an engine; a fluid coupling driven by the engine; a driven shaft, a driving shaft driven by the fluid coupling and adapted to drive the driven shaft; means operable between said shafts for driving the driven shaft from the driving shaft in underdrive or direct; said underdrive driving means including, a drive-reaction taking overrunning device adapted to overrun during the direct drive, and control means for selectively rendering said overrunning device operable to provide the underdrive or inoperable to release the underdrive; said direct driving means including second control means operating to control the direct drive; a gear continuously rotated by and with the driven shaft; a tailshaft; selectively operable change speed mechanism driven by said gear and adapted to drive the tailshaft forwardly or in reverse; driver manipulated means for selectively controlling the operation of said change speed mechanism; means operating in response to driver manipulation of said manipulated means for effecting release of said second control means to facilitate selective operation of said change speed mechanism; and means operable by the vehicle driver independently of said driver manipulated means for simultaneously actuating the first said control means to render said overrunning device inoperable and operating the second said control means to release the direct drive.

50. In a motor vehicle power transmission, a driving shaft, an output shaft, change speed mechanism between said shafts operable to provide a plurality of different speed ratio drives therebetween, said mechanism including a control device operable to control one of said speed ratio drives, a selector element adapted for actuation by the vehicle driver selectively between predetermined stations of drive control for selectively controlling other of said speed ratio drives, and means operating in response to each selective actuation of said selector element for effecting temporary drive-releasing operation of said control device to facilitate selective control of said other drives.

51. In a motor vehicle power transmission, a driving shaft, an output shaft, change speed mechanism between said shafts operable to provide a plurality of different speed ratio drives therebetween, said mechanism including a control device operable to control one of said speed ratio drives, a selector element adapted for actuation by the vehicle driver for selectively controlling other of said speed ratio drives, means operated by said selector element for selectively controlling other of said speed ratio drives, the last said means including a switch operating element moved with rotation and reciprocation by said selector element and having a series of grooves extending in the direction of reciprocation, a plunger selectively engageable with said grooves, a switch operated by said plunger when said switch operated element is rotated, and means operating in response to operation of said switch for effecting operation of said control device.

52. In a motor vehicle power transmission having a cast casing structure, speed ratio driving means, a pressure fluid operated device for controlling operation of said driving means, a plurality of pressure fluid operated motors for operating said device, pipe elements about which said casing structure is cast whereby said pipe elements are embedded within said cast casing structure for establishing communication between said motors, and means for delivering pressure fluid to said pipe elements.

53. In a motor vehicle power transmission, speed ratio driving means, a pressure fluid operated device for controlling operation of said driving means, a pump for supplying pressure fluid to said device, means for driving the pump at a speed proportionate to that of the vehicle, and a governor relief valve for the pressure fluid supply, said relief valve having a fluid metering escape passage for regulating the pressure fluid build-up from the pump to said device so as to govern the operation of said device as a function of vehicle acceleration from its position at rest.

54. In a motor vehicle power transmission having parts to be lubricated, speed ratio driving means including a pressure fluid operated drive-control device, a pump for delivering oil under pressure to said device and to said transmission parts, means for driving the pump at a speed proportionate to that of the vehicle, oil conducting means between the pump and said device, oil conducting means between the pump and said transmission parts, and a governor relief valve operating to variably restrict the oil delivered through the second said oil conducting means for regulating the oil pressure build-up in the first said oil conducting means so as to govern the operation of said device as a function of vehicle acceleration from its position at rest.

55. In a motor vehicle power transmission having parts to be lubricated, speed ratio driving means including a pressure fluid operated drive-control device, a pump for delivering oil under pressure to said device and to said transmission parts, means for driving the pump at a speed proportionate to that of the vehicle, oil conducting means between the pump and said device, oil conducting means between the pump and said transmission parts, and a governor relief valve operating to variably restrict the oil delivered through the second said oil conducting means for regulating the oil pressure build-up in the first said oil conducting means so as to govern the operation of said device as a function of vehicle acceleration from its position at rest, said relief valve having an oil metering passage for insuring constant delivery of oil through the second said oil conducting means when said relief valve is operated to provide its maximum restriction of oil delivery.

56. In an motor vehicle power transmission, means operably to provide relatively different speed ratio drives through the transmission, a pressure fluid operated device adapted to control said speed ratio driving means to change the drive through the transmission, a movable valve, a solenoid for moving said valve, a pedal operable by the vehicle driver, a pump operated by said pedal for supplying fluid under pressure to the transmission, and a switch operated by fluid pressure from said pump for controlling energization of said solenoid.

57. In a power transmission for a motor vehicle having an engine, a driving shaft adapted to be driven by the engine, a driven shaft, change speed mechanism for driving the driven shaft from the driving shaft in a plurality of relatively different speed ratios, said mechanism including a pressure fluid operated drive controlling device, means for supplying fluid under pressure to said device, a valve operable to control the pressure fluid supply to said device, a plurality of control elements operable by the vehicle driver independently of each other, a valve actuating element adapted to operate said valve in response to selective operation of said control elements, means releasably connecting each of said control elements with said valve actuating element so as to provide selective operation of said valve actuating element by said control elements.

58. In a power transmission for a motor vehicle having an engine, a driving shaft adapted to be driven by the engine, a driven shaft, change speed mechanism for driving the driven shaft from the driving shaft in a plurality of relatively different speed ratios, said mechanism including a pressure fluid operated drive controlling device, means for supplying fluid under pressure to said device, a valve operable to control the pressure fluid supply to said device, a plurality of control elements operable by the vehicle driver independently of each other, a pair of selectively operable valve actuating elements operably connected to said valve for actuating said valve independently of each other, means operably connecting one of said control elements with one of said valve actuating elements, and a plurality of independently operable means respectively operably connecting other of said control elements with the other of said valve actuating elements.

59. In a drive for a motor vehicle having an engine provided with a throttle valve actuator operable by the driver throughout a primary range of movement in adjusting the throttle from closed to open positions thereof; means providing a yielding abutment for said actuator when said actuator is moved to the limit of said primary range in throttle-opening direction, said yielding abutment accommodating driver operation of said actuator beyond said limit for a secondary range of movement; a pair of torque transmitting members; transmission means having at least a pair of driving means of predetermined fixed speed ratio respectively operable to provide a relatively slow speed ratio drive between said torque transmitting members and a relatively fast 1 to 1 speed ratio drive between said torque transmitting members; change speed means operable in response to operation of said throttle valve actuator for said secondary range of movement for effecting step-down change in the drive through said transmission means from the faster to the slower of said pair of drives; and means effecting operation and release of said relatively slow speed drive comprising an overrunning control device operably associated therewith and adapted to automatically release this drive to accommodate operation of the faster of said pair of drives and to automatically establish said relatively slow speed drive in response to release of said relatively fast speed drive; said relatively fast speed ratio driving means comprising relatively engageable drive control clutch elements operably associated therewith and adapted when engaged with each other to establish this drive and when disengaged from each other to release this drive; said change speed means comprising, an electrically energizable electromagnet for controlling operation of said drive control clutch elements, and means operable in response to operation of said throttle valve actuator for said secondary range of movement for controlling energization of said electromagnet so as to effect release of said drive control clutch elements.

60. In a drive for a motor vehicle having an engine provided with a throttle valve actuator operable by the driver throughout a primary range of movement in adjusting the throttle from closed to open positions thereof; means providing a yielding abutment for said actuator when said actuator is moved to the limit of said primary range in throttle-opening direction, said yielding abutment accommodating driver operation of said actuator beyond said limit for a secondary range of movement; a pair of torque transmitting members; transmission means having at least a pair of driving means of predetermined fixed speed ratio respectively operable to provide a relatively slow speed ratio drive between said torque transmitting members; and a relatively fast 1 to 1 speed ratio drive between said torque transmitting members; change speed means operable in response to operation of said throttle valve actuator for said secondary range of movement for effecting step-down change in the drive through said transmission means from the faster to the slower of said pair of drives; and means effecting operation and release of said relatively slow speed drive comprising an overrunning control device operably associated therewith and adapted to automatically release this drive to accommodate operation of the faster of said pair of drives and to automatically establish said relatively slow speed drive in response to release of said relatively fast speed drive; said relatively fast speed ratio driving means comprising relatively engageable drive control clutch elements operably associated therewith and adapted when engaged with each other to establish this drive and when disengaged from each other to release this drive; said change speed means comprising, spring means for releasing engagement of said drive control clutch elements, an electrically energizable electromagnet for controlling operation of said drive control clutch elements, and means operable in response to operation of said throttle valve actuator for said secondary range of movement for controlling energization of said electromagnet so as to effect release of said drive control clutch elements by said spring means.

61. In a drive for a motor vehicle having an engine provided with a throttle valve actuator operable by the driver throughout a primary range of movement in adjusting the throttle from closed to open positions thereof; means providing a yielding abutment for said actuator when said actuator is moved to the limit of said primary range in throttle-opening direction, said yielding abutment accommodating driver operation of said actuator beyond said limit for a secondary range of movement; a pair of torque transmitting members; transmission means having at least a pair of driving means of predetermined fixed speed ratio respectively operable to provide a relatively slow speed ratio drive between said torque transmitting members; and a relatively fast 1 to 1 speed ratio drive between said torque transmitting members; change speed means operable in response to oepration of said throttle valve actuator for said secondary range of movement for effecting step-down change in the drive through said transmission means from the faster to the slower of said pair of drives; and means effecting operation and release of said relatively slow speed drive comprising an overrunning control device operably associated therewith and adapted to automatically release this drive to accommodate operation of the faster of said pair of drives and to automatically establish said relatively slow speed drive in response to release of said relatively fast speed drive; said relatively fast speed ratio driving means comprising relatively engageable drive control clutch elements operably associated therewith and adapted when engaged with each other to establish this drive and when disengaged from each other to release this drive, and means operable in response to predetermined speed of travel of the vehicle for controlling operation of said drive control clutch elements; said change speed means comprising, an electrically energizable electromagnet for controlling operation of said drive control clutch elements by said speed responsive means, and means operable in response to operation of said throttle valve actuator for said secondary range of movement for controlling energization of said electromagnet so as to effect release of said drive control clutch elements.

62. In a drive for a motor vehicle having an engine provided with a throttle valve actuator operable by the driver throughout a primary range of movement in adjusting the throttle from closed to open positions thereof; means providing a yielding abutment for said actuator when said actuator is moved to the limit of said primary range in throttle-opening direction, said yielding abutment accommodating driver operation of said actuator beyond said limit for a secondary range of movement; a pair of torque transmitting members; transmission means having at least a pair of driving means of predetermined fixed speed ratio respectively operable to provide a relatively slow speed ratio drive between said torque transmitting members and a relatively fast 1 to 1 speed ratio drive between said torque transmitting members; change speed means operable in response to operation of said throttle valve actuator for said secondary range of movement for effecting step-down change in the drive through said transmission means from the faster to the slower of said pair of drives; and means effecting operation and release of said relatively slow speed drive comprising an overrunning control device operably associated therewith and adapted to automatically release this drive to accommodate operation of the faster of said pair of drives and to automatically establish said relatively slow speed drive in response to release of said relatively fast speed drive; said relatively fast speed ratio driving means comprising relatively engageable drive control clutch elements operably associated therewith and adapted when frictionally engaged with each other to establish this drive and when disengaged from each other to release this drive, and means including an electrically energizable electromagnet for controlling operation of said drive control clutch elements; said change speed means comprising means operable in response to operation of said throttle valve actuator for said secondary range of movement for controlling energization of said electromagnet so as to effect release of said drive control clutch elements.

63. In a drive for a motor vehicle having an engine provided with a throttle valve actuator operable by the driver throughout a primary range of movement in adjusting the throttle between its limits of opening and closing positions; means accommodating driver operation of said actuator throughout its said range of movement to the limit of its throttle opening movement and therebeyond for a secondary range of movement; a driving shaft adapted to receive drive from the engine; a driven shaft adapted to drive the vehicle; planetary gearing means comprising an annulus gear member, a planet pinion meshing with the annulus gear member and having a carrier member therefor, a sun gear meshing with the planet pinion, means for driving one of said members for rotation at the same speed as one of said shafts, means for driving the other of said members for rotation at the same speed as the other of said shafts; drive controlling means operable to establish a direct drive from the driving shaft to the driven shaft with the planetary gearing means turning as a unit; drive controlling means operable to hold said sun gear for establishing a drive from the driving shaft to the driven shaft through said planetary gearing means at a speed ratio differing from said direct drive; the drive controlling means for establishing the slower of the aforesaid drives comprising overrunning means operable to automatically release this drive to accommodate operation of the faster of said drives and to automatically establish said slower drive in response to release of said faster drive; the drive controlling means for establishing the faster of the aforesaid drives comprising relatively engageable drive control elements operably associated therewith and adapted when engaged with each other to establish this drive and when disengaged from each other to release this drive; an electrically energizable solenoid for controlling operation of said drive control elements; and means operable in response to operation of said throttle valve actuator for said secondary range of movement for controlling energization of said solenoid so as to effect release of said drive control elements.

64. In a drive for a motor vehicle having an engine provided with a throttle valve actuator operable by the driver throughout a primary range of movement in adjusting the throttle between its limits of opening and closing positions; means accommodating driver operation of said actuator throughout its said range of movement to the limit of its throttle opening movement and therebeyond for a secondary range of movement; a driving shaft adapted to receive drive from the engine; a driven shaft adapted to drive the vehicle; planetary gearing means comprising an annulus gear member, a planet pinion meshing with the annulus gear member and having a carrier member therefor, a sun gear meshing with the planet pinion, means for driving one of said members for rotation at the same speed as one of said shafts, means for driving the other of said members for rotation at the same speed as the other of said shafts; drive controlling means operable to establish a direct drive from the driving shaft to the driven shaft with the planetary gearing means turning as a unit; drive controlling means operable to hold said sun gear for establishing a drive from the driving shaft to the driven shaft through said planetary gearing means at a speed ratio differing from said direct drive; the drive controlling means for establishing the slower of the aforesaid drives comprising overrunning means operable to automatically release this drive to accommodate operation of the faster of said drives and to automatically establish said slower drive in response to release of said faster drive; the drive controlling means for establishing the faster of the aforesaid drives comprising relatively engageable drive control elements operably associated therewith and adapted when engaged with each other to establish this drive and when disengaged from each other to release this drive, and means operable in response to predetermined speed of travel of the vehicle for controlling operation of said drive control elements; an electrically energizable solenoid for controlling operation of said drive control elements by said speed responsive means; and means operable in response to operation of said throttle valve actuator for said secondary range of movement for controlling energization of said solenoid so as to effect release of said drive control elements.

65. In a drive for a motor vehicle according to claim 59; disabling means for said transmission means operable at the will of the driver independently of driver operation of said throttle valve actuator for said secondary range for preventing operation of said relatively fast speed driving means, said disabling means including a driver operable control member, and means operable in response to driver operation of said control member for controlling energization of said electromagnet.

66. In a drive for a motor vehicle according to claim 61; disabling means for said transmission means operable at the will of the driver independently of driver operation of said throttle valve actuator for said secondary range for preventing operation of said relatively fast speed driving means, said disabling means including a driver operable control member, and means operable in response to driver operation of said control member for controlling energization of said electromagnet.

67. In a drive for a motor vehicle according to claim 63; disabling means for said faster-drive-establishing drive control means operable at the will of the driver independently of driver operation of said throttle valve actuator for said secondary range for preventing operation of the faster of said drives, said disabling means including a driver operable control member, and means operable in response to driver operation of said control member for controlling energization of said solenoid.

68. In a drive for a motor vehicle according to claim 64; disabling means for said faster-drive-establishing drive control means operable at the will of the driver independently of driver operation of said throttle valve actuator for said secondary range for preventing operation of the faster of said drives, said disabling means including a driver operable control member, and means operable in response to driver operation of said control member for controlling energization of said solenoid.

69. In a drive for a motor vehicle having an engine provided with a throttle valve actuator operable by the driver throughout a primary range of movement in adjusting the throttle from closed to open positions thereof; means providing a yielding abutment for said actuator when said actuator is moved to the limit of said primary range in throttle-opening direction, said yielding abutment accommodating driver operation of said actuator beyond said limit for a secondary range of movement, a transmission for driving the vehicle from the engine in a plurality of variable speed ratio drives, means providing a drive through the transmission, means providing an additional drive through the transmission faster than that provided by the first said drive means, pressure fluid operating means for controlling said faster drive means, a source of pressure fluid, valve means operable to control communication between said source and said pressure fluid operating means, an electrically energizable electromagnet for controlling operation of said valve means, means operable in response to operation of said throttle valve actuator beyond said limit of its said primary range of movement for controlling energization of said electromagnet, and means operating to effect operation and release of the first recited drive means independently of said pressure fluid source and independently of operation of said throttle valve actuator beyond said limit of its said primary range of movement.

70. In a drive for a motor vehicle having an engine provided with a throttle valve actuator operable by the driver throughout a range of movement in adjusting the throttle valve from closed to open positions thereof; means providing a yielding abutment for said actuator when said actuator is moved to the limit of said primary range in throttle-opening direction, said yielding abutment accommodating driver operation of said actuator beyond said limit, a transmission for driving the vehicle from the engine in a plurality of variable speed ratio drives, means providing a drive through the transmission, means providing an additional drive through the transmission faster than that provided by the first said drive means, a pressure fluid motor operable to control said faster drive means, a source of liquid, means including a pump for supplying said liquid under pressure to said motor, valve means operable to control said liquid supply to said motor, an electrically energizable electromagnet for controlling operation of said valve means, means operable in response to operation of said throttle valve actuator beyond its said primary range of movement for controlling energization of said electromagnet for shutting off said liquid supply to said motor, and means operating to effect operation and release of the first recited drive means independently of said liquid supplying means and independently of operation of the throttle valve actuator beyond said limit of its said primary range of movement.

71. In a drive for a motor vehicle according to claim 69, disabling means for said faster driving means operable at the will of the driver independently of driver operation of said throttle valve actuator beyond said limit of its said primary range of movement for preventing operation of said faster driving means, said disabling means including a driver operable control element, and means operable in response to driver operation of said control element for controlling energization of said electromagnet.

72. In a drive for a motor vehicle having an engine provided with a throttle valve actuator operable by the driver throughout a primary range of movement in adjusting the throttle from closed to open positions thereof; means providing a yielding abutment for said actuator when said actuator is moved to the limit of said primary range in throttle-opening direction, said yielding abutment accommodating driver operation of said actuator beyond said limit for a secondary range of movement, a transmission for driving the vehicle from the engine in a plurality of variable speed ratio drives, means providing a drive through the transmission, means providing an additional drive through the transmission faster than that provided by the first said drive means, means including a pressure fluid operator for controlling said faster drive means in response to predetermined speed of travel of the vehicle, a source of pressure fluid, electromagnet operating means for controlling operation of the last said means, means operable in response to operation of said throttle valve actuator beyond said limit of its said primary range of movement for controlling energization of said electromagnet, and means operating to effect operation and release of the first recited drive means independently of said pressure fluid source and independently of operation of said throttle valve actuator beyond said limit of its said primary range of movement.

73. In a drive for a motor vehicle having an engine provided with a throttle valve actuator operable by the driver throughout a primary range of movement in adjusting the throttle from closed to open positions thereof; means providing a yielding abutment for said actuator when said actuator is moved to the limit of said primary range in throttle-opening direction, said yielding abutment accommodating driver operation of said actuator beyond said limit for a secondary range of movement; a pair of mechanisms each comprising reduction driving means cooperably associated with each other for compounding their reduction drives from the engine to the vehicle such that one of said mechanisms receives drive from the engine and transmits its reduction drive to the other of said mechanisms whence the drive is delivered to drive the vehicle; means operably associated with said drive-receiving mechanism to effect direct drive from the engine to said drive-delivering mechanism; means operating in response to operation of said throttle valve actuator for said secondary range of movement for effecting step-down change in said drive-receiving mechanism from the direct drive to the reduction drive thereof, and means operable independently of operation of said throttle valve actuator for effecting step-up and step-down change in said drive-transmitting mechanism from the reduction drive to the direct drive thereof and from the direct drive to the reduction drive thereof.

74. In a power transmission for driving a vehicle, a driving shaft adapted to receive drive from the engine, a tailshaft adapted to drive the vehicle, a shaft intermediate said driving shaft and said tailshaft, change speed mechanism operable between said driving shaft and said intermediate shaft, change speed mechanism operable between said intermediate shaft and said tailshaft, one of said mechanisms comprising selectively operable speed ratio drive means adapted for manipulation by the vehicle driver, the other of said mechanisms comprising solenoid controlled drive-controlling means for releasing drive through this mechanism so as to facilitate selective operation of said speed ratio drive means, and means operable under control of the vehicle driver incidental to selective manipulation of said speed ratio drive means for effecting energization of said solenoid.

75. In a power transmission for driving a vehicle, a driving shaft adapted to receive drive from the engine, a tailshaft adapted to drive the vehicle, a shaft intermediate said driving shaft and said tailshaft, change speed mechanism operable between said driving shaft and said intermediate shaft, change speed mechanism operable between said intermediate shaft and said tailshaft, one of said mechanisms comprising selectively operable speed ratio drive means adapted for manipulation by the vehicle driver, the other of said mechanisms comprising solenoid controlled drive-controlling means for releasing drive through this mechanism so as to facilitate selective operation of said speed ratio drive means, and driver operable remotely controlled shift means for selective manipulation of said selectively operable speed ratio drive means comprising means for controlling energization of said solenoid incidental to driver operation of said remotely controlled shift means.

76. In a power transmission for driving a vehicle, a driving shaft adapted to receive drive from the engine, a tailshaft adapted to drive the vehicle, a shaft intermediate said driving shaft and said tailshaft, change speed mechanism operable between said driving shaft and said intermediate shaft, change speed mechanism operable between said intermediate shaft and said tailshaft, one of said mechanisms comprising selectively operable speed ratio drive means adapted for manipulation by the vehicle driver, the other of said mechanisms comprising solenoid controlled drive-controlling means for releasing drive through this mechanism so as to facilitate selective operation of said speed ratio drive means, driver operable means for selectively manipulating said selectively operable speed ratio drive means, and means operable under control of the vehicle driver for controlling energization of said solenoid so as to cause said drive-controlling means to release the drive through the last mentioned mechanism during selective manipulation of said selectively operable speed ratio drive means.

77. In a power transmission for driving a vehicle, a driving shaft adapted to receive drive from the engine, a tailshaft adapted to drive the vehicle, a shaft intermediate said driving shaft and said tailshaft, change speed mechanism operable between said driving shaft and said intermediate shaft, change speed mechanism operable between said intermediate shaft and said tailshaft, one of said mechanisms comprising selectively operable speed ratio drive means adapted for manipulation by the vehicle driver, the other of said mechanisms comprising drive-controlling means operable to release the drive through this mechanism so as to facilitate selective operation of said speed ratio drive means, and means operable under control of the vehicle driver incidental to selective manipulation of said speed ratio drive means for effecting said drive-releasing operation of said drive-controlling means.

78. In a power transmission for driving a vehicle, a driving shaft adapted to receive drive from the engine, a tailshaft adapted to drive the vehicle, a shaft intermediate said driving shaft and said tailshaft, change speed mechanism operable between said driving shaft and said intermediate shaft, change speed mechanism operable between said intermediate shaft and said tailshaft, one of said mechanisms comprising selectively operable speed ratio drive means adapted for manipulation by the vehicle driver, the other of said mechanisms comprising solenoid controlled drive-controlling means for releasing drive through this mechanism so as to facilitate selective operation of said speed ratio drive means, and means operable under control of the vehicle driver adapted to effect energization of said solenoid as an incident to selective manipulation of said speed ratio drive means.

79. In a power transmission for driving a vehicle, a driving shaft adapted to receive drive from the engine, a tailshaft adapted to drive the vehicle, a shaft intermediate said driving shaft and said tailshaft, change speed mechanism operable between said driving shaft and said intermediate shaft, change speed mechanism operable between said intermediate shaft and said tailshaft, one of said mechanisms comprising selectively operable speed ratio drive means adapted for manipulation by the vehicle driver, the other of said mechanisms comprising solenoid controlled drive-controlling means for releasing drive through this mechanism so as to facilitate selective operation of said speed ratio drive means, and driver operable remotely controlled shift means for selective manipulation of said selectively operable speed ratio drive means comprising means adapted to control energization of said solenoid as an incident to selective manipulation of said speed ratio drive means.

80. In a power transmission for driving a vehicle, a driving shaft adapted to receive drive from the engine, a tailshaft adapted to drive the vehicle, a shaft intermediate said driving shaft and said tailshaft, change speed mechanism operable between said driving shaft and said intermediate shaft, change speed mechanism operable between said intermediate shaft and said tailshaft, one of said mechanisms comprising selectively operable speed ratio drive means adapted for manipulation by the vehicle driver, the other of said mechanisms comprising drive-controlling means operable to release the drive through this mechanism so as to facilitate selective operation of said speed ratio drive means, and means operable under control of the vehicle driver adapted to effect said drive-releasing operation of said drive-controlling means as an incident to selective manipulation of said speed ratio drive means.

81. In a vehicle power transmitting mechanism, clutch mechanism shiftable to modify the drive through the mechanism, means for actuating said clutch mechanism, an electric system including an over-center switch for controlling said clutch mechanism actuating means, an accelerator pedal, and means actuated by the pedal when pushed beyond wide open throttle position for tripping the switch to cause modification of the drive, said switch remaining tripped after said pedal has returned to the higher range of throttle operation.

82. In a vehicle power transmitting mechanism, a clutch mechanism shiftable to modify the drive through the power transmitting mechanism, a fluid system including a control valve for engaging said clutch mechanism, an electric system including an over-center switch for actuating said control valve, and an accelerator pedal operative to trip said switch into closed position when moved down beyond wide open throttle position, said switch remaining closed when said pedal has returned and is operating in the higher range of its throttle adjustment movement.

83. In a motor vehicle power transmitting mechanism; a first shaft; a second shaft having its forward end carried on the rear end of said first shaft; a bearing between said shaft ends; one of said shafts having an axial passage extending through one end thereof adjacent said bearing; a planetary gearing disposed around said one shaft; a fluid operable clutch means for locking said planetary gearing; a pressure fluid-oil system leading to the axial passage in said one shaft; means controlling fluid flow from said fluid-oil system to said clutch means; and passage means leading from said axial passage to said bearing, the oil flow from said axial passage to said bearing being continuous while the mechanism is driving and while oil flow to said clutch means is being controlled.

84. In a motor vehicle power transmitting mechanism; a first shaft; a second shaft having its forward end carried on the rear end of said first shaft; a bearing between said shaft ends; one of said shafts having an axial passage extending through one end thereof adjacent said bearing; a planetary gearing disposed around said one shaft; a fluid operable clutch means for locking said planetary gearing; a pump adapted for oil pumping operation; a pressure fluid-oil conducting system leading from said pump to the axial passage in said one shaft; passage means leading from said axial passage to said bearing, the oil flow from said axial passage to said bearing being continuous while said pump is operating; a second fluid conducting system branching from the first said system for conducting fluid therefrom to said clutch means; and valving means in said second fluid conducting system for controlling fluid flow therein to said clutch means.

85. In a motor vehicle power transmitting mechanism; a first shaft; a second shaft mounted on the rear end of said first shaft, one of said shafts having an axially extending oil passage providing an opening through one end thereof adjacent said mounting; planetary gearing including a sun gear sleeve around said one shaft; a clutch associated with said planetary gearing to lock or release the same; a controlled oil pressure system leading to the axial passage in said one shaft; means responsive to oil pressure in said system for controlling said clutch; and a valve controlling oil flow to said clutch control means; the oil flow in said axial passage being, while the mechanism is driving, continuous through the end opening in said one shaft to the other of said shafts regardless of the position of said valve.

86. In a planetary gear transmission for a motor vehicle having an engine, a driving shaft adapted to be driven by the engine, a driven shaft adapted to drive the vehicle, an annulus gear directly driven from the driving shaft, a planet pinion meshing with said annulus gear, an axle mounting said planet pinion, a carrier for said axle extending directly inwardly from said axle for direct drive connection with the driven shaft, a sun gear meshing with said planet pinion, overrunning control means automatically operating to prevent rotation of said sun gear in the direction of rotational tendency thereof caused by drive of said internal gear to provide a reduction drive from the driving shaft to the driven shaft, pressure fluid controlled clutch means operable to effect direct drive connection of said sun gear with said driven shaft to provide a direct drive from the driving shaft to the driven shaft, means automatically acting in response to drive of the vehicle at a predtermined speed for controlling delivery of pressure fluid to said clutch means, and means operable by the vehicle driver for controlling said pressure fluid control means such that one of said drives is rendered inoperative and the other of said drives is rendered operative and sustained both below and above said predetermined speed.

CARL A. NERACHER.
WILLIAM T. DUNN.
AUGUSTIN J. SYROVY.
TENO IAVELLI.
ROY T. BUCY.
OTTO W. SCHOTZ.

CERTIFICATE OF CORRECTION.

Patent No. 2,328,392. August 31, 1943.

CARL A. NERACHER, ET AL.

It is hereby certified that error appears in the printed specification of the above numbered patent requiring correction as follows: Page 6, second column, line 36, for "splines 92" read --splines 82--; page 8, first column, line 44, for "betwen" read --between--; page 10, first column, line 4, for "driven" read --driver--; page 11, first column, line 41, for "communicates, passage 289 with the" read --communicates with passage 289, the--; and second column, line 64, for "forwardy" read --forwardly--; page 12, first column, line 45, for "Serial No. 304,570" read --Serial No. 204,570--; line 49, after "vehicle" insert --operated--; page 20, second column, line 28, claim 1, after "axle" first occurrence, insert --extending--; page 26, first column, line 43, claim 22, for "overruuning" read --overrunning--; and second column, line 34, claim 24, for "saft" read --shaft--; and that the said Letters Patent should be read with this correction therein that the same may conform to the record of the case in the Patent Office.

Signed and sealed this 14th day of March, A. D. 1944.

Leslie Frazer (Seal)                      Acting Commissioner of Patents.